United States Patent
Mao et al.

(10) Patent No.: US 11,631,128 B1
(45) Date of Patent: Apr. 18, 2023

(54) LENDING PRODUCTS WITH DIFFERENT REPAYMENT MECHANISMS

(71) Applicant: Block, Inc., San Francisco, CA (US)

(72) Inventors: Theodore Wenjung Mao, Mill Valley, CA (US); Jacquelyn Brosamer, Oakland, CA (US); Joshua Schwarzapel, Millbrae, CA (US); Taylor Hunt, San Francisco, CA (US)

(73) Assignee: BLOCK, INC., Oakland, CA (US)

( * ) Notice: Subject to any disclaimer, the term of this patent is extended or adjusted under 35 U.S.C. 154(b) by 0 days.

(21) Appl. No.: 16/919,885

(22) Filed: Jul. 2, 2020

(51) Int. Cl.
*G06Q 40/02* (2012.01)

(52) U.S. Cl.
CPC .................. *G06Q 40/025* (2013.01)

(58) Field of Classification Search
CPC ...... G06Q 40/025; G06Q 40/02; G06Q 40/00; G06Q 40/06; G06Q 20/00; G06Q 20/04; G06Q 20/06; G06Q 20/08; G06Q 20/085; G06Q 20/0855; G06Q 20/10; G06Q 20/102; G06Q 20/108; G06Q 20/14; G06Q 20/22; G06Q 20/227; G06Q 20/229; G06Q 20/24; G06Q 20/326; G06Q 20/38
See application file for complete search history.

(56) References Cited

U.S. PATENT DOCUMENTS

| | | | | |
|---|---|---|---|---|
| 5,953,710 A | * | 9/1999 | Fleming | G07F 7/08 705/38 |
| 6,941,281 B1 | * | 9/2005 | Johnson | G06Q 20/04 705/35 |
| 2005/0234789 A1 | * | 10/2005 | Czyzewski | G06Q 40/00 705/35 |
| 2007/0192244 A1 | * | 8/2007 | Drummond | G06Q 20/10 705/39 |
| 2009/0119202 A1 | * | 5/2009 | Dumas-Brown | G06Q 20/10 705/38 |
| 2009/0254431 A1 | * | 10/2009 | Crowe | G06Q 20/105 705/14.34 |
| 2013/0179325 A1 | * | 7/2013 | Perlly | G06Q 40/025 705/38 |
| 2014/0012746 A1 | * | 1/2014 | Hanson | G06Q 40/00 705/40 |
| 2018/0075527 A1 | * | 3/2018 | Nagla | G06Q 40/025 |

* cited by examiner

*Primary Examiner* — Namrata Boveja
*Assistant Examiner* — Divesh Patel
(74) *Attorney, Agent, or Firm* — Mattingly & Malur, PC

(57) ABSTRACT

Techniques described herein are directed to lending products with different repayment mechanisms. In an example, indication(s) of purchase(s) made using a payment instrument associated with a first lending product can be associated with a first data structure, wherein the first data structure is associated with a balance determined based at least in part on the indication(s). Based at least in part on determining that the balance exceeds a predetermined threshold, a portion of the balance can be associated with a second data structure associated with a second lending product, wherein the first lending product and the second lending product are independently associated with different repayment mechanisms. The portion of the balance can therefore be repaid via a repayment mechanism associated with the second lending product.

20 Claims, 12 Drawing Sheets

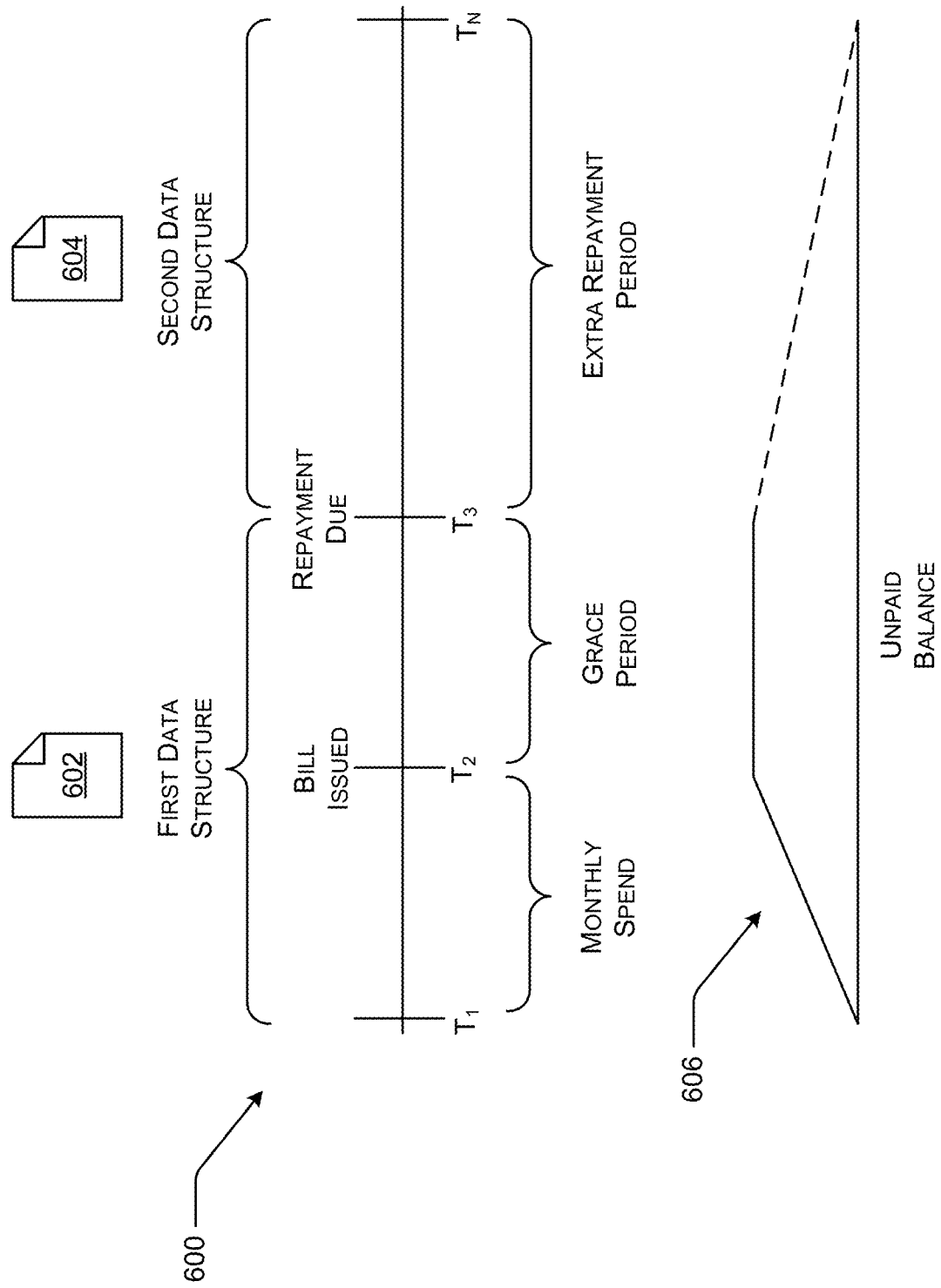

LENDING PRODUCTS WITH DIFFERENT REPAYMENT MECHANISMS

TECHNICAL FIELD

A conventional credit card allows a user to borrow money from a lender to make purchases. The user is expected to repay the borrowed money within a grace period, which is determined by the lender. If the user is not able to repay the borrowed money by the grace period, the lender adds interest, which is a percentage of money owed to the lender, to the amount that is still outstanding.

BRIEF DESCRIPTION OF THE DRAWINGS

Features of the present disclosure, its nature and various advantages, will be more apparent upon consideration of the following detailed description, taken in conjunction with the accompanying drawings.

FIG. 6 illustrates an example billing cycle associated with techniques described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 3:
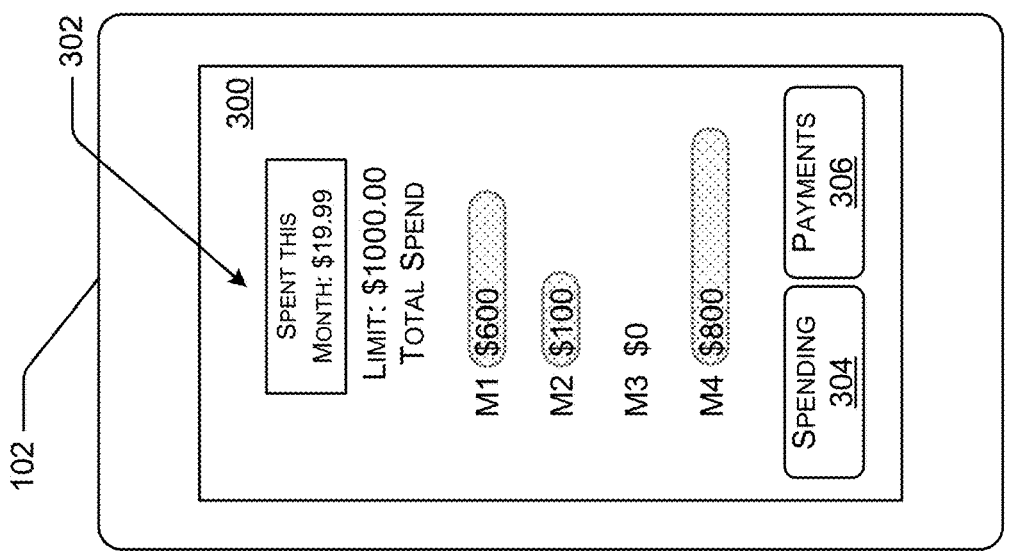
FIG. 3 illustrates yet another example GUI associated with techniques described herein.

Lending products with different repayment mechanisms are described. In an example, a service provider can provide a user with a payment instrument (e.g., a credit card) that can be associated with a spending limit (e.g., available credit). The user can use the payment instrument for making purchases. In an example, each month (e.g., calendar month), the user can spend up to their available spending limit. A sum of the purchases can be used to determine a balance associated with the payment instrument. The balance can represent the amount borrowed by the user and owed to the lender (e.g., the service provider). At the end of the month, a service provider can notify the user that they have a payment due and, if the user repays a portion of a balance associated with the payment instrument by the date it is due (i.e., due date), the available credit can be replenished by the amount of the payment. If the user pays off the entire balance due on the due date, the user can avoid a fee and keep the account associated with the payment instrument in a non-delinquent state.

In some examples, however, a user may need additional time to pay off the entire balance or a portion of the balance that is due on the due date. Techniques described herein enable the user to transition the balance from being associated with the first lending product (e.g., as described above) to a second lending product, wherein the second lending product is associated with a different repayment mechanism than the first lending product. In at least one example, the user can pay a minimum payment in association with the first lending product and can transfer the remaining balance to the second lending product, which enables the user more time to repay the remaining balance without the account becoming delinquent. In at least one example, the first lending product can be associated with a first repayment mechanism, such as automatic withdrawal from a linked bank account, and the second lending product can be associated with a second repayment mechanism that is different than the first repayment mechanism. For example, the second repayment mechanism can be associated with (i) repayment using a percentage of revenue from payments processed by the service provider on behalf of the user, (ii) a loan offered by the service provider, (iii) a loan offered by a third party, or the like.

In an example, the service provider described herein can offer one or more services to users, such as merchants. For example, the service provider can offer lending services for providing lending products to users, as described herein. In additional or alternative examples, the service provider can offer payment processing services for processing payments for transactions on behalf of users that are merchants. The service provider can offer additional or alternative services as described below. In at least one example, the service provider can provide such services via a distributed, network-based system that includes one or more computing devices (e.g., server(s)) that are associated with one or more functional components that perform computing operations on behalf of the service provider as described herein. That is, in at least some examples, operations described herein as being performed by the service provider can be performed by one or more functional components associated with the one or more computing devices as described herein. In at least one example, the one or more computing devices can be in communication with one or more user computing devices (e.g., computing device(s) operable by user(s)) that, in some examples, can be specially configured (e.g., via an application downloaded or otherwise installed thereon) to exchange data with the one or more computing devices. That is, the service provider can be associated with a distributed, network-based system comprising the one or more computing devices that are in communication with, and exchanging data with, the one or more user computing devices. Such data can, in some examples, be used for determining (i) which users quality for individual of the lending products described herein and/or (ii) terms associated with such lending products and/or repayment mechanisms associated therewith.

As described above, in at least one example, users can be merchants. Techniques described herein can leverage unconventional lending products to enable merchants to remedy short-term cash flow challenges they often face. Often merchants that have low cash flow and/or reserves struggle to access fast, affordable credit or are unable to get credit entirely. Techniques described herein leverage data determined based on interactions between merchants and customers within a merchant ecosystem to enable higher approval rates, higher spending limits, more time to repay, avoidance of personal guarantees, effortless repayment, and reduced or no fees. That is, techniques described herein leverage data determined and/or transmitted via the distributed, network-based system (e.g., the merchant ecosystem) to determine which merchants to approve for individual lending products and/or terms associated with the lending products (e.g., spending limits, time for repayment, terms of repayment, fees associated with the lending products, etc.). As such, techniques described herein offer more access to lending products than conventional lending products at least because the distributed, network-based system is able to access data that can be analyzed via machine-trained models to intelligently determine (i) which users quality for individual of the lending products described herein and/or (ii) terms associated with such lending products and/or repayment mechanisms associated therewith. In some examples, such decision making can be performed regularly (e.g., at a particular frequency, after a lapse of a period of time, etc.) such that eligible users and/or terms of repayment mechanisms are updated regularly as well. In some examples, techniques described herein help merchants avoid paying fees for longer-term credit than they need, and further reduces fees with interchange revenue.

As described above, techniques described herein can leverage the data determined based on interactions between merchants and customers within the distributed, network-based system (e.g., the merchant ecosystem) to understand merchants, and to determine which merchants to offer lending products and on what terms. That is, techniques described herein can use machine-trained models to intelligently determine which merchants to offer lending products and on what terms, and in some examples, can offer such lending products to such merchants via existing channels at little to no cost to the service provider. In some examples, eligibility and spending limits (e.g., one of the terms) can be based on forecasted gross payment volumes (GPVs) (e.g., volume of payments that merchants currently and/or are likely to use the service provider for processing) and risk scores determined based at least in part on the data determined based on interactions between merchants, customers, and/or the service provider. In some examples, identified merchants that are determined to be prequalified for lending products can be proactively targeted through electronic communications (e.g., email, text message, in-app notification, etc.) and/or via user interfaces that such merchants use to manage their information and/or interactions with the service provider (e.g., a dashboard). That is, techniques described herein offer personalized and/or customized lending products to enable flexibility with respect to borrowing money and/or repayment of such borrowed money, thereby enabling higher approval rates, higher spending limits, more time to repay, avoidance of personal guarantees, effortless repayment, and reduced or no fees. This is an improvement to existing one-size-fits-all lending products and/or repayment schemes.

In some examples, the service provider can leverage data associated with existing merchants to make recommendations for a new merchant. That is, in such examples, the service provider can leverage data associated with other merchants, which in some examples can be similar to the new merchant, to determine which lending product(s) the new merchant is qualified for and/or the terms associated with such lending product(s), even though the service provider has little to no information about the new merchant. In additional or alternative examples, the service provider can leverage data associated with other merchants, which in some examples, can be similar to a merchant, to determine which lending product(s) the new merchant is qualified for and/or the terms associated with such lending product(s). That is, as described above, techniques described herein offer personalized and/or customized lending products to enable flexibility with respect to borrowing money and/or repayment of such borrowed money, thereby enabling higher approval rates, higher spending limits, more time to repay, avoidance of personal guarantees, effortless repayment, and reduced or no fees. This is an improvement to existing one-size-fits-all lending products and/or repayment schemes.

Techniques described herein offer reassurances for lenders. For example, by offering both lending services as well as payment processing services, the service provider can prioritize repayment to the service provider prior to repayment of merchants when necessary to repay a debt owed to the service provider. That is, repayment can be nearly guaranteed by prioritizing repayment to the service provider prior to the merchants. Further, by enabling merchants to utilize sales revenue to repay balances, such balances can be repaid faster as merchants grow faster. This can be a benefit for both the merchant and the service provider. Further, as described above, in some examples, payment processing data can be utilized by the service provider to modify terms associated with lending products offered by the service provider. That is, by integrating lending services (e.g., of lending products) with payment processing services, techniques described herein can enable flexibility with respect to borrowing money and/or repayment of such borrowed money, thereby enabling higher approval rates, higher spending limits, more time to repay, avoidance of personal guarantees, effortless repayment, and reduced or no fees. This is an improvement to existing one-size-fits-all lending products and/or repayment schemes.

The methods and systems described herein help generate and record a chain of lending products, associated with a merchant, through custom data structures. In one implementation, at least the service provider facilitates the merchant to create appropriate connections for other lending products and institutions, in addition to the existing merchant-financial institution relationship. Such connections may be specific application programming interfaces (APIs) and API calls to bridge communication between disparate merchants and financial institutions. In this manner, the service provider creates the network and connections to enable the merchants and financial institutions to offer lending products without the need for creating the infrastructure themselves.

While reference is made herein to lending products, techniques described herein can apply to any type of financial product wherein a first financial product and a second financial product are associated with different repayment mechanisms.

FIGS. 1-5 illustrate non-limiting examples of graphical user interfaces (GUIs) that can be presented via a merchant device of a merchant. In at least one example, the GUIs described can be presented via an instance of an application, which can be a desktop application, a web browser application, or a dedicated application (e.g., provided by a service provider, provided by a third party, etc.), a web browser, or other functional component capable of presenting such information. In some examples, such GUIs can be presented based at least in part on actuation of a link or other mechanism. The GUIs can include one or more user interface elements, which can be text, images, logos, symbols, pictures, or any other object that can be presented via a GUI. In some examples, individual of the user interface element(s) can be selectable such to receive an input from the merchant. GUIs presented via FIGS. 1-5 are merely examples and additional or alternative content and/or configurations can be presented via additional or alternative GUIs. In some examples, such information can be output via additional or alternative user interfaces (e.g., speakers, etc.).

Figure 1:
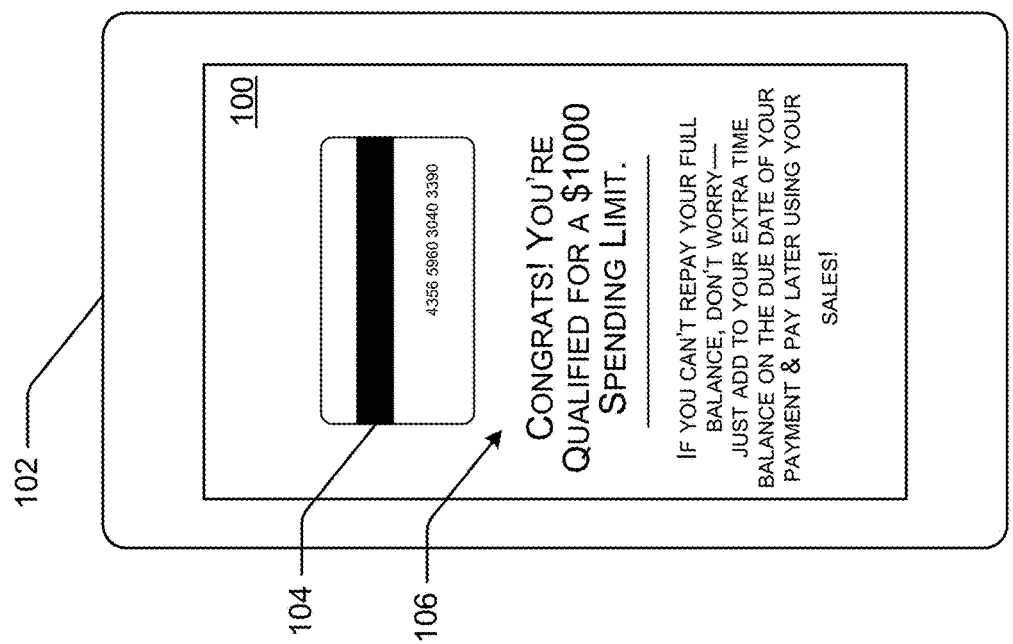
FIG. 1 illustrates an example graphical user interface (GUI) associated with techniques described herein.

FIG. 1 illustrates an example of a GUI 100 presenting information associated with a payment instrument via a merchant device 102 of a merchant. As illustrated in FIG. 1, the GUI 100 can present a user interface element 104 representative of a payment instrument associated with a service provider providing lending services. In some examples, the user interface element 104 can be a graphical representation of a physical payment instrument that can be provided to a user, such as a merchant. The merchant can use either the physical payment instrument or a virtual version of the payment instrument for purchasing items using funds availed via the payment instrument.

In at least one example, the GUI 100 can include user interface elements 106 that are representative of details associated with the lending product(s) that are associated with the payment instrument. In at least one example, the payment instrument can be associated with a first lending product that is structured as a line of credit. As illustrated in the GUI 100, the user interface elements 106 indicate an amount of credit ($1000) available via the payment instrument. That is, the payment instrument is associated with a $1000 spending limit (which can also be called a "credit limit"). In at least one example, the spending limit can represent the highest amount of credit the merchant is able to spend if the balance of the payment instrument is completely paid off. In at least one example, the spending limit can be determined based at least in part on data associated with the merchant and/or other, different merchants associated with the service provider. Furthermore, the amount of credit can be updated based on data received after an initial determination of the spending limit for the merchant. That is, the spending limit of the user can be dynamically modified, in some examples, based at least in part on changes to payment processing behavior (e.g., changed payment volume, changed average spend, changed frequency, etc.). Additional details are described below.

In at least one example, the merchant can use the payment instrument for making purchases and can get a predetermined number of days (e.g., 30-60 days) of float to help with cash flow of the merchant. The merchant can be expected to repay a balance associated with the payment instrument (and thus, first lending product) on a due date, which can be determined based on the predetermined number of days of float, a last day of a calendar month, or the like. Such a balance can be a "spending balance" that represents the total amount of money the merchant has spent (that has not been rolled over to a second lending product). If additional time is needed for the merchant to repay the complete balance due (e.g., on the due date), the merchant can be presented with an option to roll a portion of the spending balance (e.g., unpaid) to a second lending product for extending the time for repayment. In some examples, when the merchant opts to add an unpaid portion of the spending balance to the second lending product, a flat fee may be added to the new amount rolled into the second lending product. In at least one example, the portion of the spending balance transferred to the second lending product can be the "extra time balance," which can be set aside for the merchant to pay using another repayment mechanism. In some examples, the merchant may be required to pay a minimum payment, or satisfy another condition, before having the option to transfer the unpaid portion of the spending balance to the extra time balance. An example timeline of the billing cycle associated with the payment instrument is described below.

Figure 2:
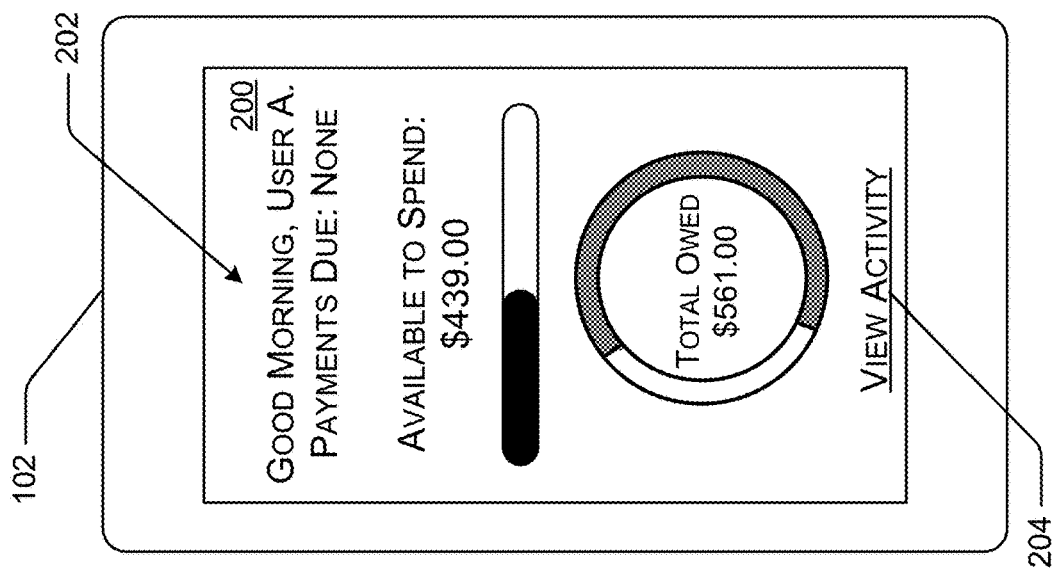
FIG. 2 illustrates another example GUI associated with techniques described herein.

FIG. 2 illustrates an example of a GUI 200 presenting information associated with an account of a merchant via the merchant device 102. In at least one example, as illustrated in the GUI 200, the merchant can access information associated with an account that is associated with the payment instrument. In some examples, the GUI 200 can be accessed via another GUI that the merchant uses to manage interactions with the service provider (e.g., a dashboard). In at least one example, the GUI 200 can include one or more user interface elements 202 representative of information associated with the account. For example, the user interface element(s) 202 can indicate credit available to the merchant (i.e., "available credit"), which can indicate an amount the merchant has available to spend. The available credit can amount to the spending limit less the total payment instrument balance. The total payment instrument balance can represent the total amount of money spent by the merchant that the merchant can pay off at any time (e.g., the spending balance and the extra time balance). As the merchant makes payments toward the total payment instrument balance, the available credit can be replenished, and the merchant can have access to spend more. In at least one example, the merchant can access the GUI 200 at any time to determine the amount they have available to spend at that time. In at least one example, as the merchant pays down their total payment instrument balance, credit (in the amount of the payment) becomes available again in near-real time, and can be reflected in the information presented via the GUI 200.

In at least one example, the user interface element(s) 202 can additionally indicate the total payment instrument balance (i.e., "total owed"), a spending balance, an extra time balance, a past due balance (e.g., a balance that represents minimum payments that have not been made), whether a payment is due, a due date for payment, etc. In at least one example, the GUI 200 can include a link 204 or other mechanism, the actuation of which, can cause another GUI, such as the GUI 300 illustrated in FIG. 3, to be presented via the merchant device 102. That is, based at least in part on the merchant actuating the link 204, the merchant device 102 can present another GUI that includes information associated with activity of the account. Such activity can include spending, payments, and/or the like. In an alternative example, instead of presenting another GUI, such activity information can be presented via a pop-up, overlay, or the like (e.g., on top of the GUI 200).

FIG. 3 illustrates an example of a GUI 300 presenting information associated with account activity of the account of the merchant via the merchant device 102. The GUI 300 can include one or more user interface elements 302 that represent information associated with the account and/or activity of the account. For instance, the user interface elements 302 can represent a total amount spent (e.g., the spending balance) for the current month (e.g., $19.99), the spending limit associated with the payment instrument (e.g., $1000), total spends by month, and the like.

In some examples, the GUI 300 can include one or more controls or other mechanisms, such as the control 304 and the control 306, that when actuated can cause additional or alternative information to be presented via the GUI 300 or another GUI. In at least one example, actuation of the control 304 can cause spending information (e.g., a spending history) associated with the account to be presented via the GUI 300. In such an example, individual transactions and/or items associated with transactions can be presented via the GUI 300 or another GUI. Such spending information can include an amount, a transaction type, a date, an indication of whether payment is pending or posted, a merchant, item(s), etc. associated with each transaction associated with the payment instrument. In some examples, such spending information can be referred to as "transaction data." In at least one example, actuation of the control 306 can cause payment information associated with the account to be presented via the GUI 300. In such an example, individual payments can be presented via the GUI 300 or another GUI. In an additional or alternative example, such payment information can include an indication of whether the merchant has rolled over a portion of the balance associated with the payment instrument to another lending product and/or repayment information associated with such a balance.

Figure 4:
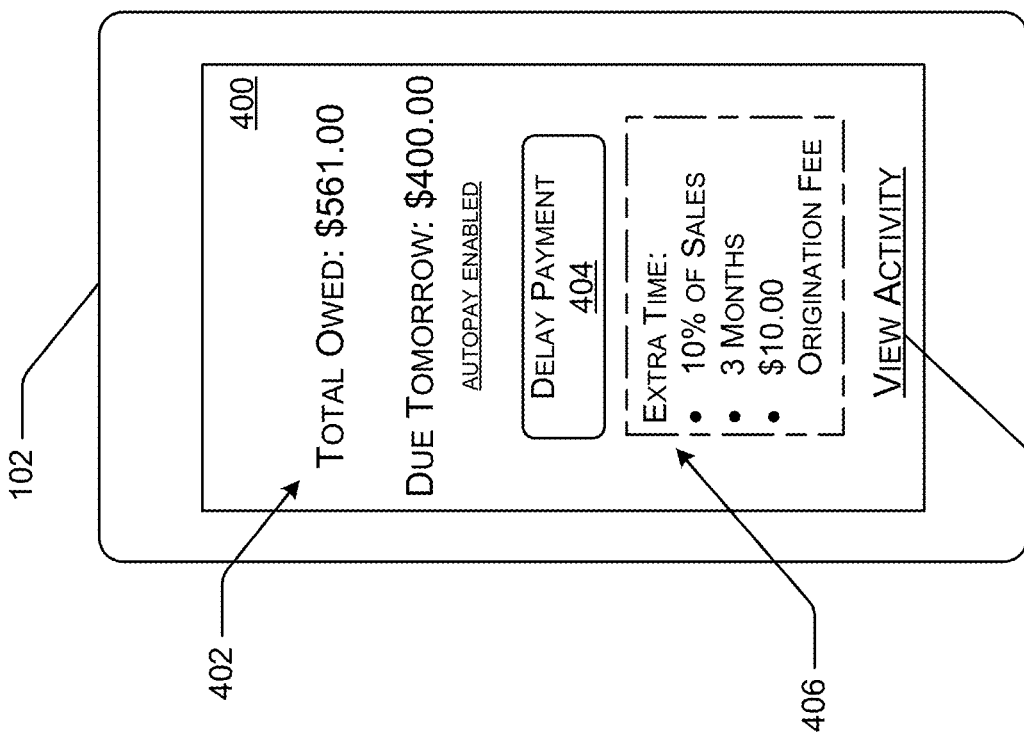
FIG. 4 illustrates another example GUI associated with techniques described herein.

FIG. 4 illustrates an example of a GUI 400 presenting repayment information associated with the payment instrument via the merchant device 102. In at least one example, the GUI 400 can include one or more user interface elements 402 that are associated with repayment information. For example, the user interface element(s) 402 can indicate a total amount owed (e.g., $561.00) and an amount that is due on the due date (e.g., $400). That is, the user interface element(s) 402 can indicate a spending balance, a due date for payment, a minimum payment due, a repayment mechanism, and/or the like. In some examples, as described above, the first lending product associated with the payment instrument can be associated with a first repayment mechanism. In at least one example, the first repayment mechanism can be associated with repayment via a deposit from a bank account of the merchant that is linked to the account associated with the payment instrument (e.g., as represented by a user interface element of the user interface element(s) 402). In such an example, the service provider can access funds from the linked bank account to make the payment for the amount due. In some examples, such repayment can be automatically (if authorized by the merchant) or based on an input from the merchant. If multiple accounts are linked, the merchant may be required to select an account from which the minimum payment is to be withdrawn. The first lending product can be associated with an additional or alternative repayment mechanism. For example, payment can be made via a one-time payment from a bank account, via automated clearing house (ACH), via a physical check, etc. The user can make a payment at any time before or after the due date. In some examples, a payment made outside of the traditional billing cycle can be applied in a hierarchy, such as to a previous spending balance, a current spending balance, and then an extra time balance. Additional details associated with such balances are described below.

In some examples, the GUI 400 can include a control 404 or other mechanism that can enable the merchant to provide an input to request to delay payment. In such examples, based at least in part on actuation of the control 404, at least a portion of the amount due can be rolled over to a second lending product associated with a second repayment mechanism that is different than the first repayment mechanism. In some examples, the second repayment mechanism can be associated with (i) repayment using a percentage of revenue from payments processed by the service provider on behalf of the user, (ii) a loan offered by the service provider, (iii) a loan offered by a third party, or the like. In some examples, the GUI 400 can include one or more user interface elements 406 which represent one or more terms associated with the second lending product. In some examples, such term(s) can be determined based at least in part on data associated with the merchant and/or data associated with other merchants associated with the service provider. In some examples, such term(s) can include a length of an extension of time for repayment, a percentage of revenue withheld from payments processed for the merchant (e.g., by the service provider) for repayment of the portion of the balance, a flat fee assessed for moving the portion of the balance to the second lending product, and/or the like. In at least one example, the service provider can determine the term(s) associated with the second lending product each time the merchant opts to roll an unpaid portion of the spending balance over to the extra time balance associated with the second lending product.

In at least one example, the GUI 400 can include a link 408 or other mechanism, the actuation of which, can cause another GUI, such as the GUI 300 illustrated in FIG. 3, to be presented via the merchant device 102. That is, based at least in part on the merchant actuating the link 408, the merchant device 102 can present another GUI that includes information associated with activity of the account. Such activity can include spending, payments, and/or the like. In an alternative example, instead of presenting another GUI, such activity information can be presented via a pop-up, overlay, or the like (e.g., on top of the GUI 400).

Figure 5:
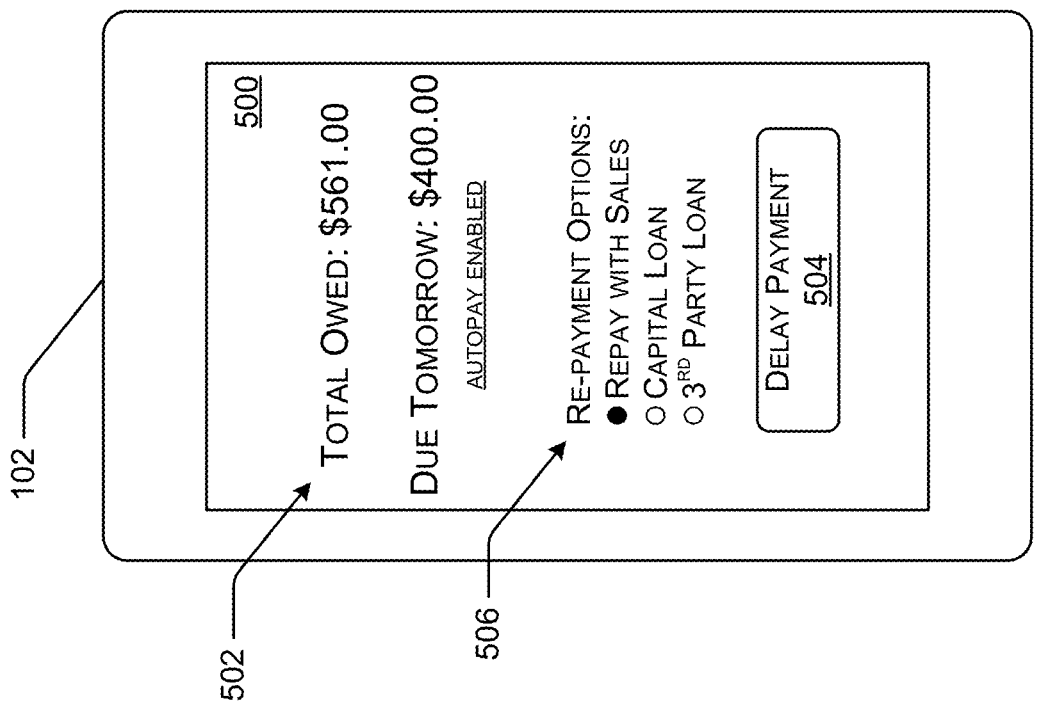
FIG. 5 illustrates yet another example GUI associated with techniques described herein.

FIG. 5 illustrates an example of a GUI 500 presenting repayment information associated with the payment instrument via the merchant device 102. Similar to the GUI 400 described above with reference to FIG. 4, in at least one example, the GUI 500 can include one or more user interface elements 502 that are associated with repayment information. As described above, the user interface element(s) 502 can indicate a spending balance, a due date for payment, a minimum payment due, a repayment mechanism, and/or the like.

In some examples, the GUI 500 can include a control 504 or other mechanism that can enable the merchant to provide an input to request to delay payment. In such examples, based at least in part on actuation of the control 504, at least a portion of the amount due can be rolled over to a second lending product associated with a second repayment mechanism that is different than the first repayment mechanism. In some examples, the second repayment mechanism can be associated with (i) repayment using a percentage of revenue from payments processed by the service provider on behalf of the user, (ii) a loan offered by the service provider, (iii) a loan offered by a third party, or the like. In some examples, second repayment mechanism options can be presented via the GUI 500. As illustrated in FIG. 5, the GUI 500 includes one or more user interface elements 506 that represent different repayment mechanism options. In some examples, the user interface element(s) 506 can be selectable such that the merchant can select one of the repayment mechanism options and actuate the control 504 to send an indication of the selection to the service provider.

In at least one example, the service provider can recommend one of the repayment mechanism options for the merchant based at least in part on data associated with the merchant and/or data associated with other merchant(s) associated with the service provider. In some examples, the service provider can utilize a machine-trained model to determine such a recommendation. In at least one example, the GUI 500 can include an indication of a recommended repayment mechanism option. Such an indication can be a flag, symbol, icon, or the like that visually differentiates the recommended repayment mechanism option from the other options.

In some examples, GUIs like those described with reference to FIGS. 4 and 5 can be presented prior to a due date of a payment. In additional or alternative examples, such GUIs can be presented on a due date or at any time a balance is determined to exceed a predetermined threshold.

FIGS. 6-9 illustrate example billing cycles and repayment processes. For purposes of this discussion, a first lending product, which can be associated with the payment instrument as described herein, can be associated with a spending limit, or a maximum amount of credit that a user associated with the payment instrument is permitted to spend. As described above, a spending limit can also be referred to as a credit limit. In at least one example, the spending limit can be determined based at least in part on data associated with the user and/or other users associated with the service provider. In examples where the user is a merchant, the spending limit can be determined based at least in part on a volume of transactions processed by the service provider on behalf of the merchant, a frequency of such transactions, an average spend associated with such transactions, items sold via such transactions, and/or the like. The spending limit can be dynamically adjusted based at least in part on merchant data determined and/or received after a preliminary determination of the spending limit of a merchant. Additional details are described below.

In at least one example, the service provider can determine an amount of funds spent during a designated period of time. In at least one example, when a designated period of time is a calendar month, the user can spend up to the spending limit during the month and, whatever amount the user spends on purchases using the payment instrument during a month can be referred to as a "monthly spend." As the user makes purchases, the cost of such purchases, when added together, sums to a balance. That is, a balance associated with such spending can be referred to as a spending balance, as described above. In at least one example, at then end of the designated period of time—or the end of the month—the service provider can issue a bill indicating a balance that is outstanding (i.e., unpaid). The user has another designated period of time to pay off the balance (i.e., pay the bill) before the payment is due. In at least one example, the other designated period of time can be a calendar month. Such a period of time can be referred to as a "grace period," or a period of time during which the service provider provides free float after a monthly spend and prior to a due date of the bill (e.g., at the end of the other designated period of time). The payment is due on the "due date."

In at least one example, after the grace period has expired and the bill becomes due (i.e., on the due date), the user can choose to repay the full amount of the unpaid balance or, the user can opt to roll at least a portion of the unpaid balance into a second lending product, which can be associated with an "extra time balance," as described above. In at least one example, the second lending product can be associated with a different repayment mechanism than the first lending product and, in some examples, can give the user more time to repay the full amount of the balance. That is, in at least one example, the second lending product can enable the user to repay the portion of the unpaid balance transferred to the second lending product (i.e., the extra time balance) over a period of time. In some examples, the period of time (e.g., the "extra time period") can be determined based at least in part on data associated with the user and/or other users associated with the service provider. In some examples, the repayment mechanism associated with the second lending product can include (i) repayment using a percentage of revenue from payments processed by the service provider on behalf of the user, (ii) a loan offered by the service provider, (iii) a loan offered by a third party, or the like. As the user repays portions of the extra time balance over time, the total payment instrument balance can decrease (and available credit can increase).

FIG. 6 illustrates an example timeline 600 that is representative of a billing cycle associated with lending product(s) as described herein. In at least one example, a user can use a payment instrument to make purchases during a first period of time from a first time ($T_1$) to a second time ($T_2$). The time period between the first time ($T_1$) and the second time ($T_2$) can be referred to as a "billing cycle." In at least one example, the first period of time can be associated with a calendar month and thus, funds spent during the first period of time can be referred to as a monthly spend, as described above. At the end of the first period of time (e.g., at $T_2$), the service provider can issue a bill which is due at a future time (e.g., a third time ($T_3$)). The period of time between the second time ($T_2$) and the third time ($T_3$) can be associated with a second period of time and can be a period of time during which the service provider provides free float after the monthly spend. This second period of time can be referred to as the grace period, as described above. In at least one example, data associated with purchases (e.g., transaction data) made in association with the monthly spend can be associated with a first data structure 602 that is associated with a first lending product having a first repayment mechanism. That is, the first data structure can store transaction data and an indication of the spending balance associated with the monthly spend. As described with reference to FIG. 6, the spending balance can be equal to the unpaid balance at the third time ($T_3$).

At the third time ($T_3$), the user can choose to repay the full amount of the unpaid balance or, the user can opt to roll at least a portion of the unpaid balance into a second lending product, which can be associated with an extra time balance, as described above. In at least one example, the second lending product can be associated with a different repayment mechanism than the first lending product. In at least one example, the second lending product can enable the user to repay the portion of the unpaid balance transferred to the second lending product (i.e., the extra time balance) over a period of time. In some examples, the period of time (e.g., the extra time period) can be determined based at least in part on data associated with the user and/or other users associated with the service provider. In some examples, the repayment mechanism associated with the second lending product can include (i) repayment using a percentage of revenue from payments processed by the service provider on behalf of the user, (ii) a loan offered by the service provider, (iii) a loan offered by a third party, or the like. In some examples, the service provider can assess a fee for transferring the portion of the unpaid balance to the second lending product. In some examples, the fee can be a flat fee for all users. In other examples, the fee can be determined based at least in part on data associated with the user and/or other users (e.g., risk-based). In some examples, the user can set the fee. In some examples, the user may not be permitted to transfer the portion of the balance unless a condition is satisfied (e.g., a minimum payment is made, the user agrees to terms associated with the second lending product, etc.).

In at least one example, the portion of the unpaid balance transferred to the second lending product can be associated with a second data structure 604. That is, an indication of the portion of the unpaid balance transferred to the second lending product can be associated with the second data structure. Such an indication can represent the extra time balance, as described herein. In some examples, the first data structure 602 can be a parent data structure and the second data structure 604 can be a child data structure. If the extra time balance associated with the second data structure 604 is repaid and thus is below a predetermined threshold, the service provider can merge the second data structure 604, or data associated therewith, into the first data structure 602. That is, if the extra time balance associated with the second data structure 604 falls below a predetermined threshold (e.g., a zero balance), the service provider can merge the second data structure 604, or data associated therewith, into the first data structure 602.

In some instances, the second lending product is offered by a financial institution different and distinct from the one offering the first lending product. That is, in some examples, different financial institutions can offer the first lending product and the second lending product. In such examples, the service provider can establish the first data structure 602 and connection with the first financial institution separate from the second data structure 604 and connection with the second financial institution, however the service provider can internally maintain the association between the two data structures and the merchant. The connections with the financial institutions are customized based in part on the characteristics of the merchant platform, financial institution's platform, and/or the network. For example, each of the connections may involve customization of specific API interfaces to communicate with the financial institution's platform and the merchant platforms. Furthermore, the service provider may also generate specific API calls to the API interfaces of the financial institution's platform and/or the merchant platforms. The service provider also facilitates compliance of security and data requirements of such platforms. To that end, the connections created by the service provider are secure and independent of the other connections that exist between the merchant and the service provider.

Below the timeline 600, FIG. 6 includes a graph 606 representing the unpaid balance during the timeline shown above. That is, as the user makes purchases during the monthly spend, the unpaid balance can increase. As described above, the unpaid balance can be the spending balance until the due date that repayment is due (unless prepayment is made). During the grace period, the unpaid balance can remain the same (unless prepayment is made). If the user opts to roll the unpaid balance, or a portion thereof, over to the second lending product, the unpaid balance, which can now be the extra time balance associated with the second lending product, can decrease over time until the balance is paid off (e.g., at $T_N$). As the user repays portions of the unpaid balance over time, the unpaid balance can decrease, as shown in the graph 606.

Figure 7:
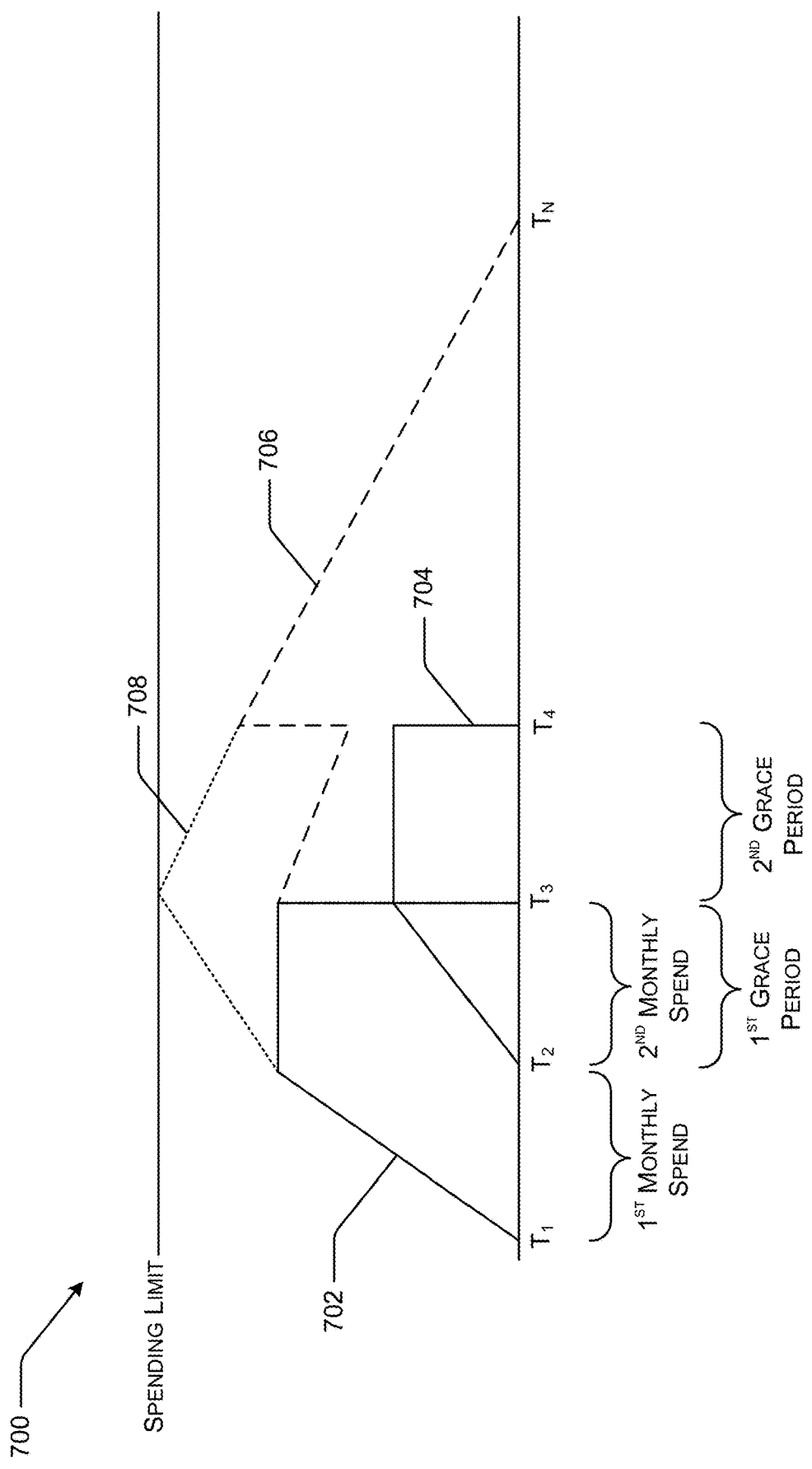
FIG. 7 illustrates an example graph associated with a first example wherein a user opts to roll portion(s) of unpaid balance(s) from a first lending product to a second lending product at the end of grace period(s).

FIG. 7 illustrates an example graph 700 associated with a first example wherein a user opts to roll portion(s) of an unpaid balance from a first lending product to a second lending product at the end of grace period(s).

In at least one example, a user can be permitted to use a payment instrument to spend up to a spending limit, as indicated in the graph 700. As described above, in some examples, the spending limit can be determined based at least in part on data associated with the user and/or other users associated with the service provider. In at least one example, a user can use a payment instrument to make purchases during a first period of time from a first time ($T_1$) to a second time ($T_2$). In at least one example, a balance associated with purchases made during the first period of time can be called a spending balance, as described above. In at least one example, the first period of time can be associated with a calendar month and thus, funds spent during the first period of time can be referred to as a monthly spend (e.g., a first monthly spend), as described above. The first line 702 represents the amount of the first monthly spend during the first period of time. That is, the first line 702 can represent a first spending balance of the first month.

At the end of the first period of time ($T_2$), the service provider can issue a bill which is due at a future time (e.g., a third time ($T_3$)). The period of time between the second time ($T_2$) and the third time ($T_3$) can be associated with a second period of time and can be a period of time during which the service provider provides free float after the first monthly spend. In at least one example, the second period of time (e.g., from $T_2$ to $T_3$) can be associated with a first grace period.

At the third time ($T_3$), which can correspond to the due date for repaying the spending balance of the first month, the user can choose to repay the full amount of the unpaid balance (e.g., the full amount of the first spending balance) or the user can opt to roll at least a portion of the unpaid balance into a second lending product, which can be associated with an extra time balance, as described above In at least one example, if the user opts to roll at least the portion of the unpaid balance into the second lending product, the service provider can determine terms associated with the second lending product and/or a repayment mechanism associated therewith.

In some examples, the user can use the payment instrument to make purchases during the second period of time from the second time ($T_2$) to a third time ($T_3$). In at least one example, funds spent during the second period of time can be referred to as a second monthly spend and can be associated with a second spending balance. The second line 704 represents the amount of the second monthly spend during the second period of time. That is, the second line 704 represents the second spending balance associated with the second month. At the end of the second period of time (e.g., at $T_3$), the service provider can issue a bill which is due at a future time (e.g., a fourth time ($T_4$)). The period of time between the third time ($T_3$) and the fourth time ($T_4$) can be associated with a third period of time and can be a period of time during which the service provider provides free float after the second monthly spend. In at least one example, the third period of time can be associated with a second grace period.

As the user repays the extra time balance associated with the second lending product between the third time ($T_3$) and the fourth time ($T_4$), the extra time balance can decrease. That is, the extra time balance, which is represented by a third line 706, can decrease as the user repays the extra time balance. At the fourth time ($T_4$), the user can choose to repay the full amount of the unpaid balance (e.g., the second spending balance) or the user can opt to roll at least a portion of the unpaid balance into the second lending product, which can be associated with the extra time balance. In at least one example, if the user opts to roll at least the portion of the unpaid balance from the second monthly spend into the second lending product, the extra time balance can increase, and the service provider can determine updated terms associated with the second lending product. That is, if the user opts to roll a portion of the balance associated with the second monthly spend into the second lending product, the extra time balance can increase to the sum of an unpaid portion of the portion of the first spending balance rolled into the second lending product and the unpaid portion of the second spending balance rolled into the second lending product.

As described above, in at least one example, the second lending product can enable the user to repay the portion of the unpaid balance transferred to the second lending product (i.e., the extra time balance) over a period of time. In some examples, the period of time (e.g., the extra time period) can be determined based at least in part on data associated with the user and/or other users associated with the service provider and can be updated each time additional balances outstanding are transferred to the second lending product. As described above, if the user opts to roll the balance over to the second lending product, the extra time balance can decrease over time (as the extra time balance is repaid) until the extra time balance is paid off (e.g., at $T_N$). As the user repays portions of the extra time unpaid balance over time, the total payment instrument balance can decrease (and available credit can increase).

In FIG. 7, the fourth line 708 represents utilization of the credit line available to the user. That is, when the portion of the balance associated with the first monthly spend is rolled over to the second lending product and the user is using the payment instrument during the second monthly spend the user is utilizing the credit line nearly at its maximum. However, as repayment is made during the second grace period (and there is no additional spend), the credit line utilization decreases. As described above, as the user repays portions of the extra time balance over time, the total payment instrument balance can decrease, and the credit line utilization can also decrease.

Figure 8:
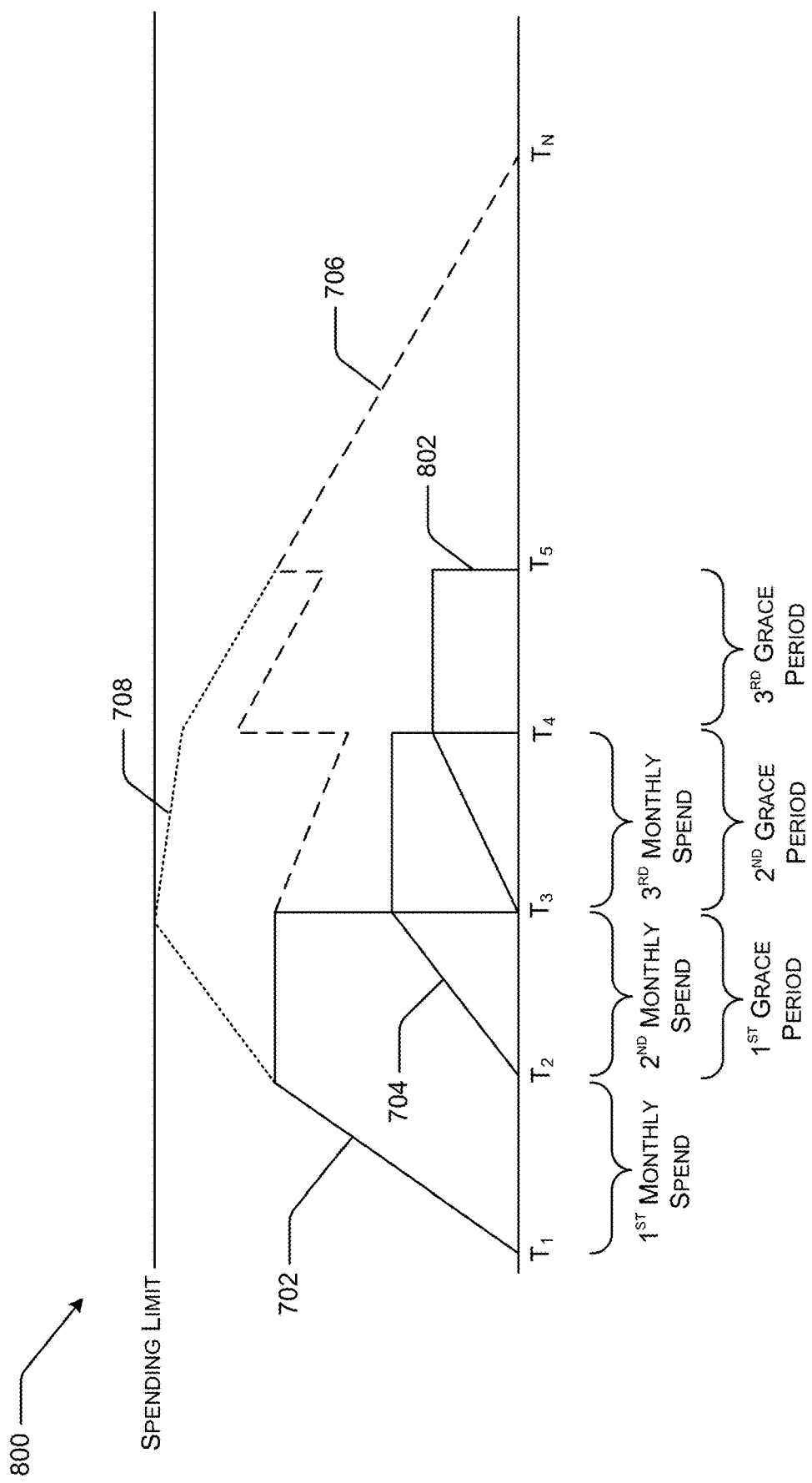
FIG. 8 illustrates an example graph associated with a second example wherein a user opts to roll portion(s) of unpaid balance(s) from a first lending product to a second lending product at the end of grace period(s).

FIG. 8 illustrates an example graph 800 associated with a second example wherein a user opts to roll portion(s) of unpaid balance(s) from a first lending product to a second lending product at the end of grace period(s). The graph 800 is substantially similar to the graph 700 described above with reference to FIG. 7. However, in FIG. 8, the user uses the payment instrument to make purchases during the third period of time between the third time ($T_3$) and the fourth time ($T_4$), which can be the third monthly spend that is associated with a third spending balance. The fifth line 802 represents the amount of the third monthly spend during the third period of time. That is, the fifth line 802 represents the third spending balance associated with the third monthly spend. At the end of the third period of time ($T_4$), the service provider can issue a bill which is due at a future time (e.g., a fifth time ($T_5$)). The period of time between the fourth time ($T_4$) and the fifth time ($T_5$) can be associated with a fourth period of time and can be a period of time during which the service provider provides free float after the third monthly spend. In at least one example, the fourth period of time can be associated with a third grace period.

On each due date (e.g., at $T_3$, $T_4$, $T_5$), if the user opts to roll at least a portion of the unpaid balance over to the second lending product, the service provider can determine whether to update terms associated with the second lending product and repayment mechanism associated therewith. For instance, in some examples, the service provider can determine whether to increase or decrease the percentage of revenue that is withheld from future payments that are processed by the service provider. In some examples, the service provider can determine to extend the period for repayment. In some examples, the service provider can offer the user options for modifying the repayment mechanism associated with the second lending product at each due date and/or when a portion of an unpaid balance is transferred from a first lending product to a second lending product.

As described above, in at least one example, the second lending product can enable the user to repay the portion of the unpaid balance transferred to the second lending product (i.e., the extra time balance) over a period of time. In some examples, the period of time (e.g., the extra time period) can be determined based at least in part on data associated with the user and/or other users associated with the service provider and can be updated each time additional balances outstanding are transferred to the second lending product. As described above, if the user opts to roll the balance over to the second lending product, the extra time balance can decrease over time (as the extra time balance is repaid) until the extra time balance is paid off (e.g., at $T_N$). As the user repays portions of the extra time unpaid balance over time, the total payment instrument balance can decrease (and available credit can increase).

In FIG. 8, the fourth line 708 represents utilization of the credit line available to the user. That is, when the portion of the balance associated with the first monthly spend is rolled over to the second lending product and the user is using the payment instrument during the second monthly spend, the user is utilizing the credit line nearly at its maximum. As repayment is made during the second grace period and there is additional spend (e.g., third monthly spend), the utilization of the credit line can decrease but not as much as in FIG. 7 (e.g., where there was no spend during the third monthly spend). However, as repayment is made during the third grace period (and there is no additional spend), the credit line utilization decreases. As described above, as the user repays portions of the unpaid balance over time, the unpaid balance can decrease, and the credit line utilization can also decrease.

Figure 9:
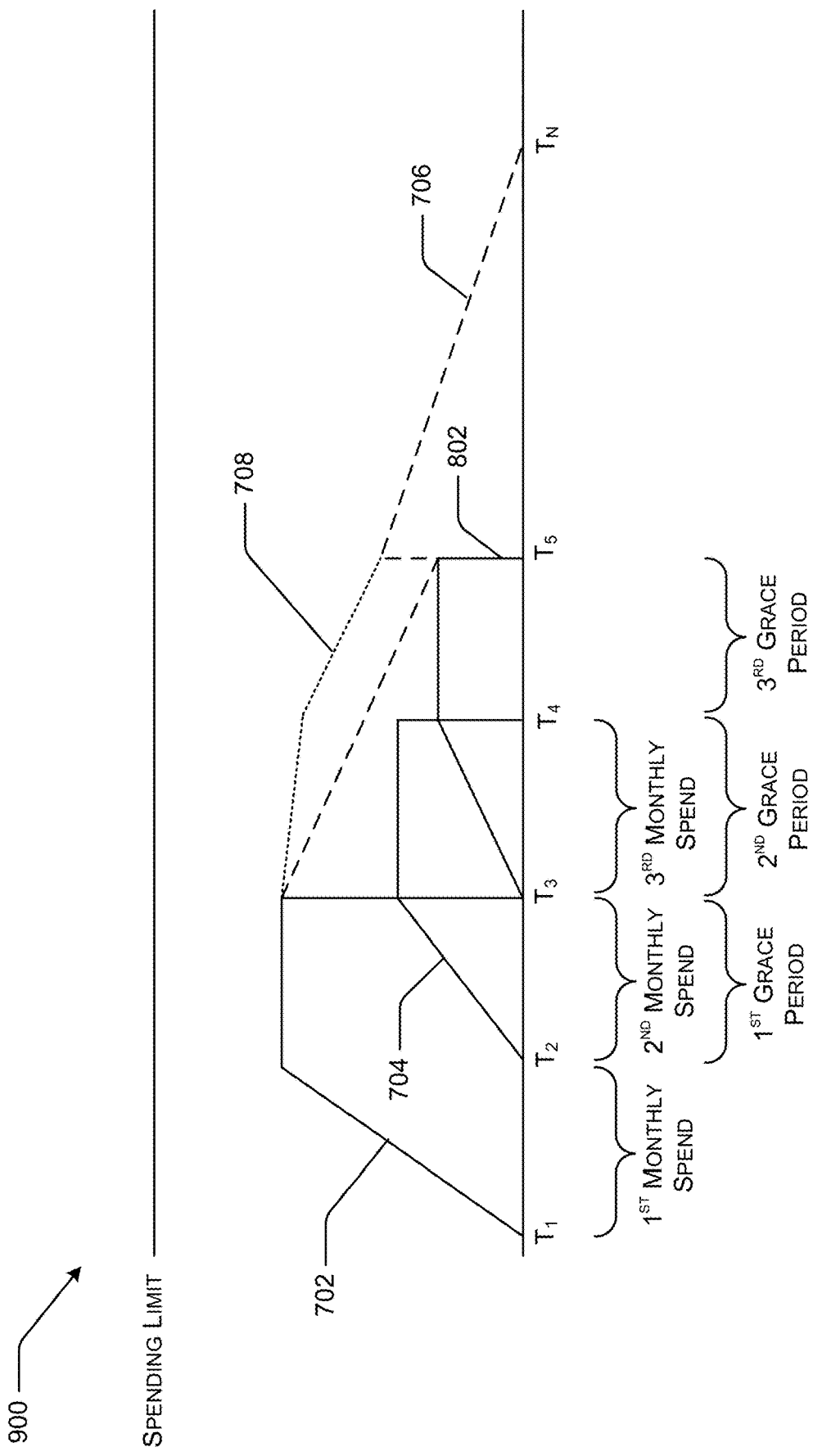
FIG. 9 illustrates an example graph associated with a third example wherein a user opts to roll portion(s) of unpaid balance(s) from a first lending product to a second lending product at the end of grace period(s).

FIG. 9 illustrates an example graph 900 associated with a third example wherein a user opts to roll portion(s) of unpaid balance(s) from a first lending product to a second lending product at the end of grace period(s). The graph 900 is substantially similar to the graph 800 described above with reference to FIG. 8. However, in FIG. 9, the user pays off the second monthly spend such that the user pays the second spending balance in full. As such, the service provider need not determine whether to update terms associated with the second lending product at the due date of the second monthly spend (e.g., at the fourth time ($T_4$)), and the credit utilization and extra time balance can therefore decrease over time. However, at the due date for the third monthly spend (e.g., $T_5$), the user opts to roll over an unpaid portion of the third spending balance to the second lending product. Thus, the extra time balance associated with the second lending product can increase at the fifth time ($T_5$). In at least one example, the service provider can determine whether to update terms associated with the second lending product and/or the repayment mechanism associated therewith at the fifth time ($T_5$) when the user opts to roll over the unpaid portion of the third spending balance.

As described above, in at least one example, the second lending product can enable the user to repay the portion of the unpaid balance transferred to the second lending product (i.e., the extra time balance) over a period of time. In some examples, the period of time (e.g., the extra time period) can be determined based at least in part on data associated with the user and/or other users associated with the service provider and can be updated each time additional balances outstanding are transferred to the second lending product. As described above, if the user opts to roll the balance over to the second lending product, the extra time balance can decrease over time (as the extra time balance is repaid) until the extra time balance is paid off (e.g., at $T_N$). As the user repays portions of the extra time unpaid balance over time, the total payment instrument balance can decrease (and available credit can increase).

In FIG. 9, the fourth line 708 represents utilization of the credit line available to the user. Because the user pays off the second monthly spend, the credit line utilization does not increase at the third time ($T_3$), and as repayment is made during the second and third grace periods, the credit line utilization decreases. As described above, as the user repays portions of the unpaid balance over time, the unpaid balance can decrease, and the credit line utilization can also decrease.

While FIGS. 1-9 reference "due dates" and enabling the user to transfer a portion of a balance from the first lending product to the second lending product, in some examples, the user can transfer the portion of the balance from the first lending product to the second lending product at additional or alternative times, for example, before a due date and/or when the balance associated with the first lending product exceeds a predetermined threshold, as described below. In some examples, the predetermined threshold can be determined by the service provider. In some examples, the predetermined threshold can be determined by the user. In some examples, the predetermined threshold can be a zero balance.

Figure 14:
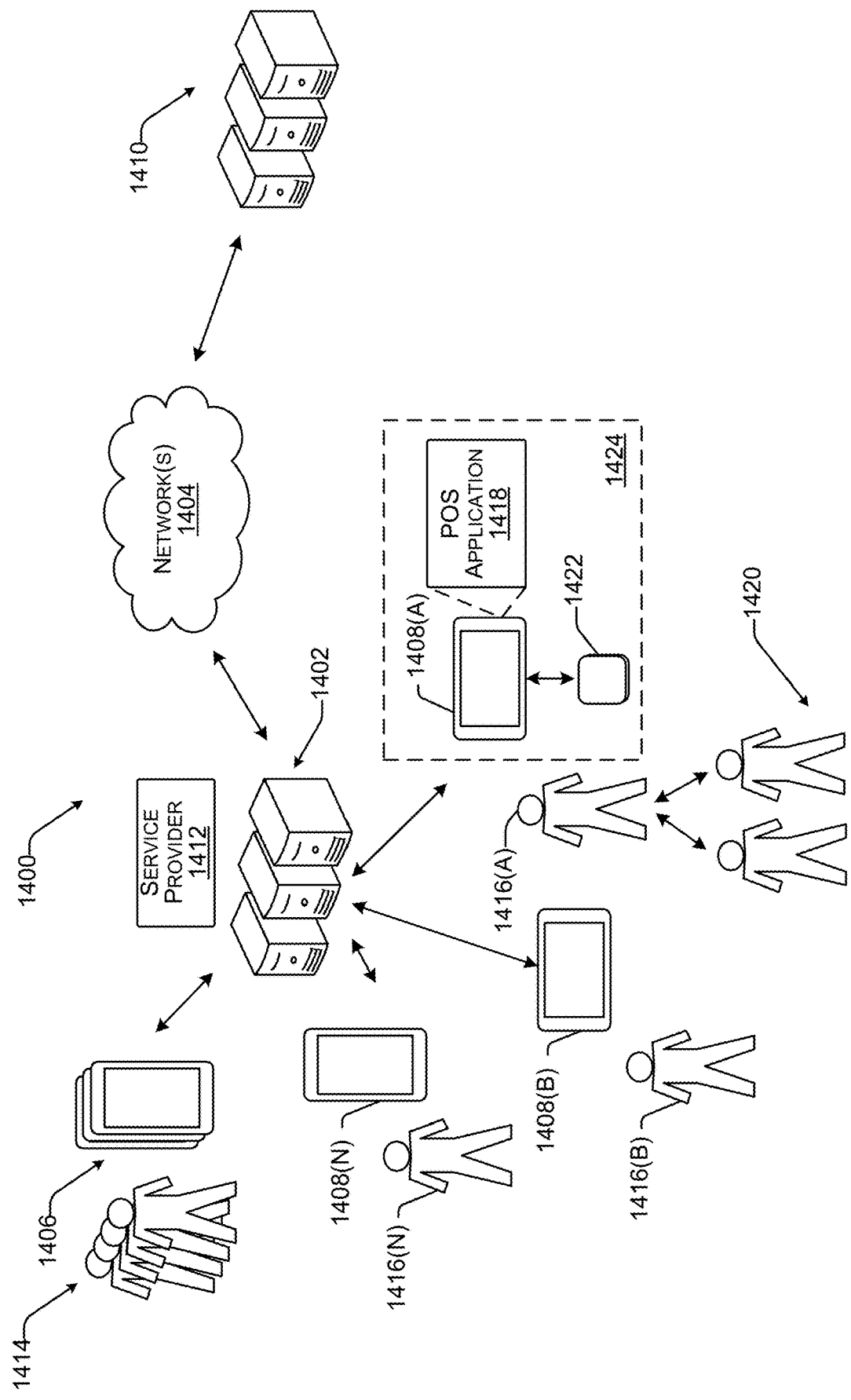
FIG. 14 illustrates an example merchant ecosystem for facilitating, among other things, techniques described herein.
Figure 15:
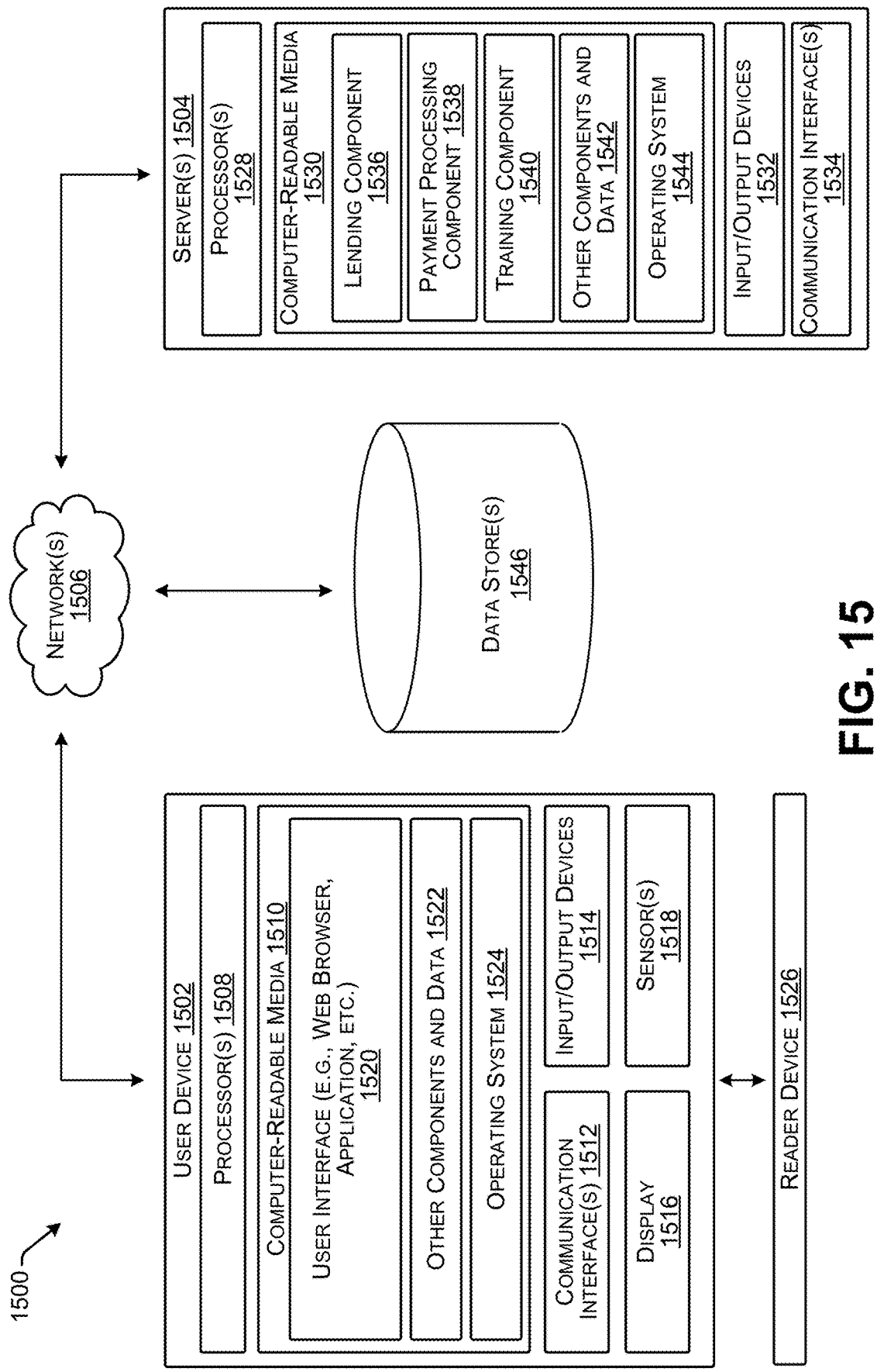
FIG. 15 illustrates additional details associated with individual components of the merchant ecosystem described above in FIG. 14.

FIGS. 10-13 are flowcharts showing example processes involving techniques as described herein. FIGS. 14 and 15, below, provide details associated with components performing operations as described herein. The processes illustrated in FIGS. 10-13 are not limited to being performed using components described in FIGS. 14 and 15, and such components are not limited to performing the processes illustrated in FIGS. 10-13.

The processes 1000-1300 are illustrated as collections of operations shown in logical flowcharts, which represent sequences of operations that can be implemented in hardware, software, or a combination thereof. In the context of software, the operations represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the process can be omitted entirely. Moreover, the processes 1000-1300 can be combined in whole or in part with each other or with other processes.

Figure 10:
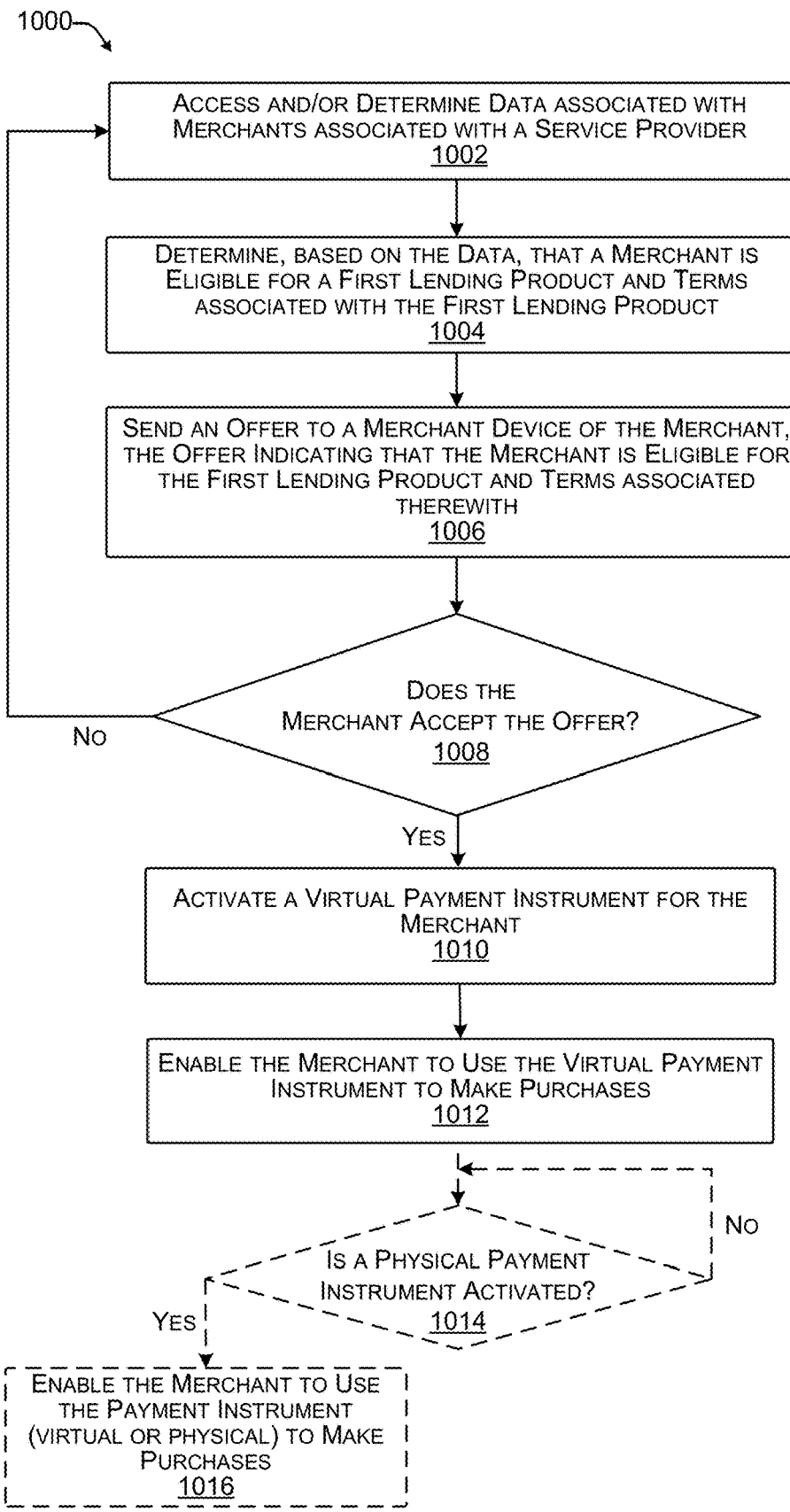
FIG. 10 illustrates an example process for identifying eligible merchant(s) to target for a first lending product and facilitating activation of a payment instrument associated with the first lending product, as described herein.

FIG. 10 illustrates an example process 1000 for identifying eligible merchant(s) to target for a first lending product and facilitating activation of a payment instrument associated with the first lending product, as described herein.

At operation 1002, the service provider can access and/or determine data associated with merchants that are associated with the service provider.

In at least one example, the service provider can be associated with one or more data store(s), described below, which can store, among other types of data, merchant data. In some examples, the merchant data is organized in an account, profile, or other merchant-specific data store. In at least one example, merchant data can include data about a merchant (e.g., name, phone number, email, social media handle, geographic location, operating hours, etc.), merchant identifier(s) (e.g., unique identifier, phone number, email address, social media handle, etc.) associated with the merchant, payment instrument(s) and/or account(s) associated with the merchant, a merchant category classification (MCC) associated with the merchant, item(s) offered for sale by the merchant, hardware (e.g., device type) used by the merchant, a length of time the merchant has used services of the service provider, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), lending data associated with the merchant (e.g., previous lending products used by the merchant, repayment progress in association with existing lending products used by the merchant, previous defaults on said lending products, etc.), risk data associated with the merchant (e.g., FICO score, indications of risk, instances of fraud, chargebacks, etc.), appointments data (e.g., previous appointments, upcoming (scheduled) appointments, timing of appointments, lengths of appointments, etc.) associated with the merchant, payroll data (e.g., employees, payroll frequency, payroll amounts, etc.) associated with the merchant, employee data associated with the merchant, permission data (e.g., indications of which operations are associated with permission(s), which employees have said permission(s), etc.) associated with the merchant, reservations data (e.g., previous reservations, upcoming (scheduled) reservations, interactions associated with such reservations, etc.) associated with the merchant, inventory data associated with the merchant, customer service data associated with the merchant, etc. In some examples, an account, profile, or other merchant-specific data store can securely store bank account data as provided by a merchant.

In at least one example, data that represents interactions between merchants and the service provider can be referred to as "interaction data." That is, in some examples, portions of the merchant data described above can be interaction data. In at least one example, the service provider can determine interaction data based at least in part on merchant data of a merchant. For instance, the service provider can determine GPV, which can indicate an average number of payments processed by the service provider on behalf of the merchant during a predetermined period of time (e.g., one day, one week, one month, one year, etc.). In some examples, the interaction data can indicate a frequency of transactions processed by the service provider on behalf of the merchant during a predetermined period of time, an average spend associated with such transactions, items sold via such transactions, and/or the like.

In some examples, merchant data can be used to predict a GPV—or any other interaction data—for a future period of time. In at least one example, such a prediction can be based on comparing merchant data associated with a merchant with other merchant data associated with other merchants that use the service provider for processing payments and/or for other services. In some examples, a machine-trained data model can be trained to output a prediction with respect to GPV—or any other interaction data—using such merchant data. In at least one example, the service provider can use the machine-trained data model to analyze the merchant data and output a prediction with respect to GPV, or any other interaction data. In some examples, such a prediction can be output at a particular frequency, after a lapse of a period of time, or the like.

In some examples, the merchant data and/or interaction data can be used to determine a level of risk associated with a merchant, as it pertains to repaying a loan or other lending product. In such examples, a machine-trained data model can be trained to output a prediction with respect to a level of risk using merchant data associated with merchants that use the service provider for processing payments and/or for other services. In at least one example, the service provider can use such a machine-trained model to determine a level of risk associated with a merchant, as it pertains to repaying a loan or other lending product. In some examples, such a determination can be output at a particular frequency, after a lapse of a period of time, or the like.

At operation 1004, the service provider can determine, based on the data, that a merchant is eligible for a first lending product and terms associated with the first lending product. In at least one example, the service provider can utilize the merchant data, the interaction data, level(s) of risk output for merchant(s), and/or the like to determine that a merchant is eligible for a first lending product. In some examples, a merchant can be determined to be eligible for the first lending product based at least in part on interaction data meeting or exceeding a threshold (e.g., GPV meeting or exceeding a threshold, average spend meeting or exceeding a threshold, or the like). In some examples, a merchant can be determined to be eligible for the first lending product based at least in part on a level of risk determined for the merchant being below a threshold level of risk. In some examples, a machine-trained data model can analyze the merchant data, the interaction data, level(s) of risk output, etc. to identify eligible merchant(s). In such examples, the machine-trained data model can output a score, or other indicator, indicating whether a merchant is eligible for the first lending product. In such examples, a score that meets or exceeds a threshold can indicate that the merchant is eligible for the first lending product and a score that is below a threshold can indicate that the merchant is not eligible for the first lending product.

In at least one example, the service provider can utilize the merchant data, the interaction data, level(s) of risk output for merchant(s), and/or the like to determine terms associated with the first lending product, for merchant(s) to whom the first lending product is available. In at least one example, such terms can include spending limits, time for repayment, terms of repayment, repayment options, fees associated with the lending products, etc.

At operation 1006, the service provider can send an offer to a merchant device of the merchant, the offer indicating that the merchant is eligible for the first lending product and terms associated therewith. In some examples, merchants that are determined to be prequalified for lending products can be proactively targeted through electronic communications. That is, in some examples, the service provider can send an email, text message, in-app notification, etc. to a merchant device of the merchant. Content associated with such an email, text message, in-app notification, etc. can be presented via a user interface. In some examples, the service provider can send a notification to a merchant device which can be presented via a user interface that a merchant uses to manage their information and/or interactions with the service provider (e.g., a dashboard). In at least one example, an offer can be sent via direct mail or presented via social media. In some examples, the offer can indicate that the merchant is eligible for the first lending product and terms associated therewith. That is, the offer can comprise a notification that indicates that the merchant is eligible for the first lending product and terms associated therewith and, in some examples, a mechanism that can be actuated for the merchant to accept the offer.

At operation 1008, the service provider can determine whether the merchant accepts the offer. In at least one example, the service provider can wait for the merchant to accept the offer for the first lending product. In some examples, the offer can be valid for a period of time and the service provider can wait until the period of time has lapsed to determine whether the merchant accepts the offer. In at least one example, based at least in part on receiving an indication of an input indicating an acceptance of the offer, the service provider may prompt the merchant for additional information and/or to confirm information stored in association with an account, profile, or other merchant-specific data store associated with the merchant. That is, the service provider can cause one or more requests for such additional information and/or a confirmation of such information to be presented via a GUI or other user interface associated with the merchant device.

In some examples, based at least in part on the merchant accepting the offer, the service provider can associate a payment instrument that can be used with the first lending product with an account of the merchant. In at least one example, the service provider can activate a virtual payment instrument for the merchant, as illustrated at operation 1010 and thus can enable the merchant to use the virtual payment instrument to make purchases, as illustrated at operation 1012. Furthermore, the service provider can cause a physical payment instrument to be sent to the merchant (e.g., via mail) or can otherwise provide a physical payment instrument to the merchant.

At operation 1014, which can be optional, the service provider can determine whether a physical payment instrument is activated. In at least one example, the service provider can determine whether the physical payment instrument has been activated. In some examples, the merchant can activate the payment instrument via an interaction with a merchant device associated with the merchant. That is, in some examples, as described above, the merchant device can be associated with an application provided by the service provider that can configure the merchant device as a payment terminal capable of communicating with the service provider and accepting payment data for processing payments. In at least one example, the merchant can activate the physical card by causing an interaction (e.g., dip, tap, swipe, etc.) between the payment instrument and the merchant device (e.g., a reader device associated therewith). Based at least in part on causing an interaction between the physical instrument and the merchant device, the merchant can activate the physical payment instrument. In some examples, the merchant can activate the physical payment instrument via an online portal. In some examples, the merchant can activate the physical instrument by phone or other device. If the merchant has not activated the physical payment instrument, the service provider can enable the merchant to use the virtual payment instrument to make purchases until the physical payment instrument is activated. If the merchant has activated the physical payment instrument, the service provider can enable the merchant to use the payment instrument (virtual or physical) to make purchases, as illustrated at operation 1016.

While FIG. 10 is directed to an example process 1000 for intelligently identifying merchants that are eligible for the first lending product, in some examples, a merchant can request or apply for the first lending product without first having been identified by the service provider. For instance, a merchant can interact with a user interface of a merchant device to request an offer for the first lending product (e.g., via a webpage, social media post, dashboard user interface, or the like). In such an example, the service provider can receive the request and can determine whether the merchant is eligible and/or determine term(s) associated with the first lending product based at least in part on data associated with the merchant and/or other merchants associated with the service provider. If the merchant is eligible, the service provider can send an offer to the merchant device, as illustrated at operation 1006, and the process 1000 can proceed as described above with reference to FIG. 10.

Figure 11:
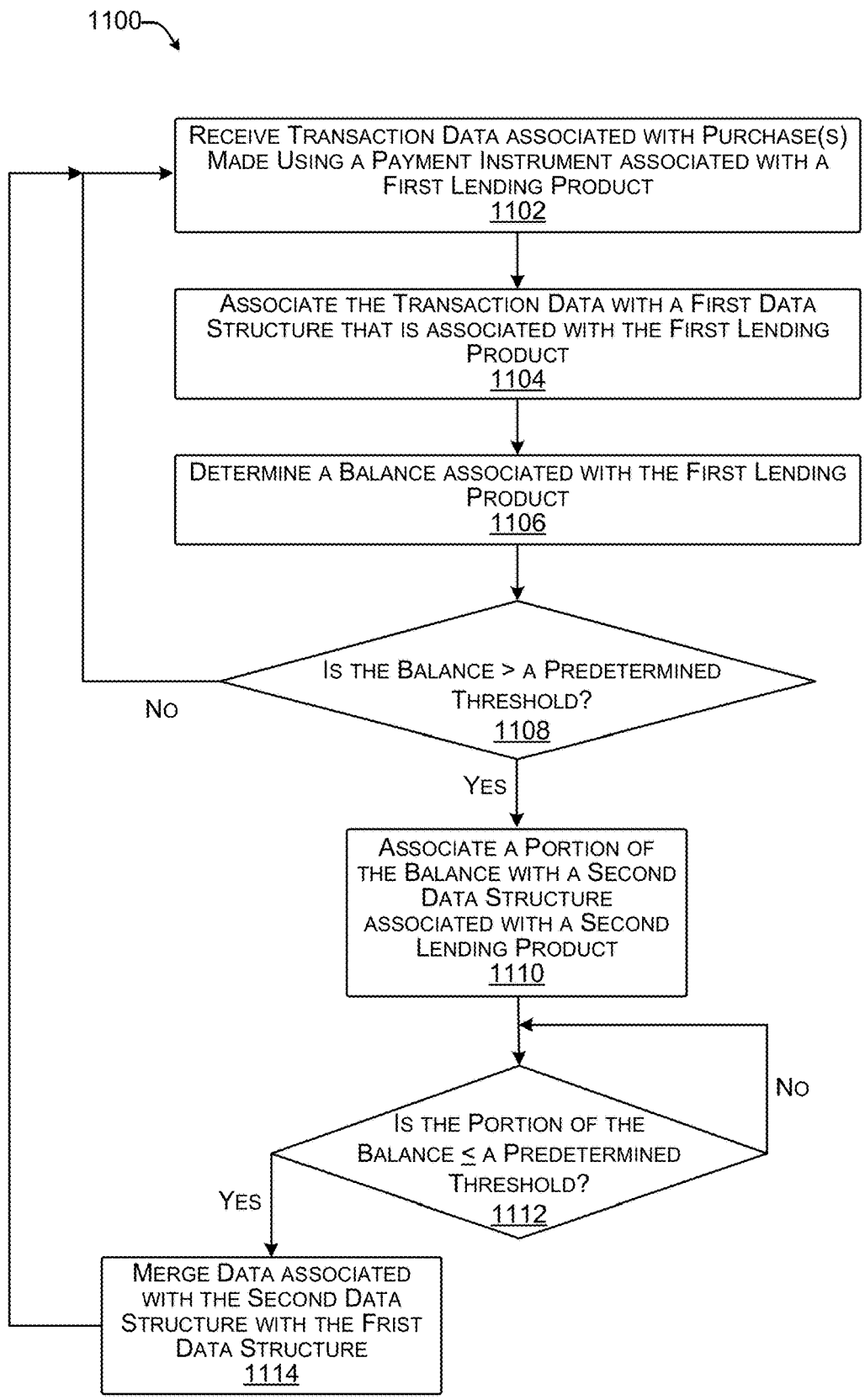
FIG. 11 illustrates an example process for managing different lending products associated with different repayment mechanisms, as described herein.

FIG. 11 illustrates an example process 1100 for managing different lending products associated with different repayment mechanisms, as described herein.

At operation 1102, the service provider can receive transaction data associated with purchase(s) made using a payment instrument associated with a first lending product. In at least one example, such transaction data, which can also be called spending data, can include an amount, a transaction type, a date, an indication of whether payment is pending or posted, a merchant, item(s), etc. associated with each transaction associated with the payment instrument.

In some examples, as described above, the first lending product associated with the payment instrument can be associated with a first repayment mechanism. In at least one example, the first repayment mechanism can be associated with repayment via a deposit from a bank account of the merchant that is linked to the account associated with the payment instrument. In such an example, the service provider can access funds from the linked bank account to make the payment for the amount due. In some examples, such repayment can be automatically (if authorized by the merchant) or based on an input from the merchant. If multiple accounts are linked, the merchant may be required to select an account from which the minimum payment is to be withdrawn. The first lending product can be associated with an additional or alternative repayment mechanism. For example, payment can be made via a one-time payment from a bank account, via ACH, via a physical check, etc. The user can make a payment at any time before or after the due date.

At operation 1104, the service provider can associate the transaction data with a first data structure that is associated with the first lending product. In at least one example, the service provider can associate the transaction data with a first data structure that is associated with the first lending product. The first data structure can be stored in a data store associated with the service provider. In some examples, the first data structure can be a parent data structure.

At operation 1106, the service provider can determine a balance associated with the first lending product. In at least one example, the service provider can use the transaction data to determine a total cost of item(s) purchased using the payment instrument. In at least one example, the total cost can represent a spending balance, which, when associated with a designated period of time (e.g., month), can be called a monthly spend, as described above.

At operation 1108, the service provider can determine whether the balance is greater than a predetermined threshold. In at least one example, the service provider can compare the balance with a predetermined threshold. In some examples, the predetermined threshold can be a zero balance. In some examples, the predetermined threshold can be designated by the service provider, the merchant, or the like. In some examples, the service provider can compare the balance with the predetermined threshold on, or before, a due date associated with payment of the spending balance. In some examples, the service provider can compare the balance with the predetermined threshold responsive to a request from the merchant, at a particular frequency, after a lapse of a period of time, or the like. If the balance is less than the predetermined threshold, the service provider can refrain from rolling a portion of the balance into a second lending product and the process 1100 can return to operation 1102.

At operation 1110, the service provider can associate a portion of the balance with a second data structure that is associated with a second lending product. In at least one example, if the balance is greater than the predetermined threshold, the service provider can roll a portion of the balance into a second lending product. In at least one example, the second lending product can be associated with a different data structure. That is, the service provider can associate the unpaid balance in association with the first lending product, or a portion thereof, with the second data structure associated with the second lending product. As described above, the portion of the unpaid balance that is rolled into a second lending product, can be associated with an extra time balance.

In at least one example, the service provider can cause a user interface to be presented via a merchant device of the merchant. The user interface can notify the merchant that the merchant can opt to transfer the portion of the balance to a second lending product. In at least one example, such a user interface can be presented on a due date or prior to a due date of payment of the balance. In at least one example, such a user interface can include terms associated with the second lending product and/or a repayment mechanism associated therewith. Non-limiting examples of GUIs that can be presented via such a user interface are described above with reference to FIGS. 4 and 5. In some examples, the service provider can associate the portion of the balance with the second data structure responsive to receiving an indication of input associated with the user interface. In such examples, the merchant can interact with the user interface to accept an offer or otherwise effectuate the transfer of the portion of the balance to the second lending product. In at least one example, based at least in part on receiving an indication of such an interaction, the service provider can associate the portion of the balance with the second data structure. In other examples, the service provider can transfer the portion of the balance automatically (i.e., without action from the merchant).

In some examples, the second lending product can be associated with a different repayment mechanism than the first lending product. In such examples, the repayment mechanism associated with the second lending product can include (i) repayment using a percentage of revenue from payments processed by the service provider on behalf of the user, (ii) a loan offered by the service provider, (iii) a loan offered by a third party, or the like. In at least one example, the service provider can determine term(s) associated with the second lending product, and second repayment mechanism, based at least in part on the balance being transferred to the second lending product. In at least one example, the service provider can determine such term(s) based at least in part on the existing extra time balance (if applicable), the amount intended to be transferred to the second lending product, data associated with the merchant, or the like. In at least one example, the terms can include a "hold rate" indicating a percentage of revenue from payments processed by the service provider to withhold, a length of time for repayment, a fee associated with rolling the unpaid balance to the second lending product, and/or the like.

In some examples, the service provider can assess a fee for transferring the portion of the unpaid balance to the second lending product. In some examples, the fee can be a flat fee for all merchants. In other examples, the fee can be determined based at least in part on data associated with the merchant and/or other merchants (e.g., risk-based). In some examples, the merchant can set the fee. In at least one example, an assessed fee can be added to the extra time balance.

In some examples, the merchant may not be permitted to transfer the portion of the balance unless a condition is satisfied. For example, the service provider may require the merchant to make a minimum payment prior to transferring the portion of the balance from the first lending product to the second lending product. In an additional or alternative example, the service provider may require the merchant to provide an indication that the merchant agrees to terms associated with the second lending product prior to transferring the portion of the balance from the first lending product to the second lending product.

In some instances, the second lending product is offered by a financial institution different and distinct from the one offering the first lending product. Accordingly, the service provider can establish the first data structure and connection with the first financial institution separate from the second data structure and connection with the second financial institution, however the service provider can internally maintain the association between the two data structures and the merchant. The connections with the financial institutions are customized based in part on the characteristics of the merchant platform, financial institution's platform, and/or the network. For example, each of the connections may involve customization of specific API interfaces to communicate with the financial institution's platform and the merchant platforms. Furthermore, the service provider may also generate specific API calls to the API interfaces of the financial institution's platform and/or the merchant platforms. The service provider also facilitates compliance of security and data requirements of such platforms. To that end, the connections created by the service provider are secure and independent of the other connections that exist between the merchant and the service provider.

At operation 1112, the service provider can determine whether the portion of the balance (e.g., associated with the second data structure) is less than or equal to a predetermined threshold. In at least one example, the service provider can determine whether the portion of the balance is less than or equal to the predetermined threshold. In some examples, the predetermined threshold can be a zero balance. However, in some examples, the predetermined threshold can be designated by the service provider, the merchant, or the like. In some examples, the predetermined threshold at operation 1112 can be the same predetermined threshold as described above with reference to operation 1108. In other examples, the predetermined threshold at operation 1112 can be a different predetermined threshold than the predetermined threshold described above with reference to operation 1108.

In at least one example, if the portion of the balance is greater than the predetermined threshold at operation 1112, the process 1100 can return to operation 1112 to determine whether the portion of the balance is less than or equal to the predetermined threshold at a later time. That is, the process 1100 can continue to determine whether the portion of the balance is less than or equal to the predetermined threshold until the balance is less than or equal to the predetermined threshold, at which point, the service provider can merge data associated with the second data structure with the first data structure, as illustrated at operation 1114. That is, in some examples, the second data structure can be a child data structure that can be merged with the first data structure (e.g., the parent data structure) dynamically based on the balance (e.g., the extra time balance) associated with the second data structure. In some examples, the portion of the balance associated with the second data structure can decrease as the merchant repays the extra time balance and, when the extra time balance has been repaid, the service provider can then merge the data associated with the second data structure with the first data structure. That is, the service provider can merge the second data structure with the first data structure.

Figure 12:
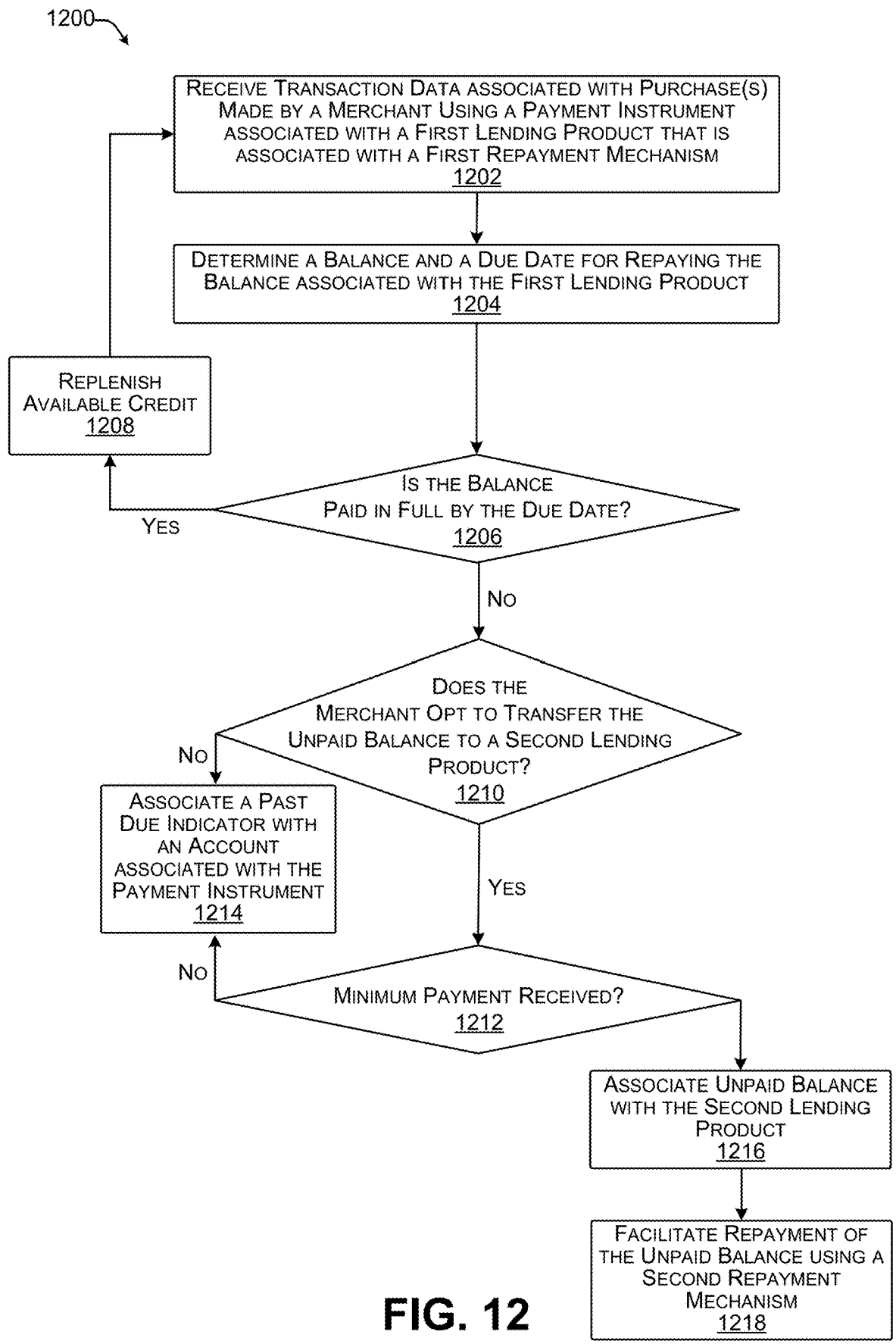
FIG. 12 illustrates another example process for managing different lending products associated with different repayment mechanisms, as described herein.

FIG. 12 illustrates another example process 1200 for managing different lending products associated with different repayment mechanisms, as described herein.

At operation 1202, the service provider can receive transaction data associated with purchase(s) made using a payment instrument associated with a first lending product that is associated with a first repayment mechanism. In at least one example, such transaction data, which can also be called spending data, can include an amount, a transaction type, a date, an indication of whether payment is pending or posted, a merchant, item(s), etc. associated with each transaction associated with the payment instrument.

In some examples, as described above, the first lending product associated with the payment instrument can be associated with a first repayment mechanism. In at least one example, the first repayment mechanism can be associated with repayment via a deposit from a bank account of the merchant that is linked to the account associated with the payment instrument. In such an example, the service provider can access funds from the linked bank account to make the payment for the amount due. In some examples, such repayment can be automatically (if authorized by the merchant) or based on an input from the merchant. If multiple accounts are linked, the merchant may be required to select an account from which the minimum payment is to be withdrawn. The first lending product can be associated with an additional or alternative repayment mechanism. For example, payment can be made via a one-time payment from a bank account, via ACH, via a physical check, etc. The user can make a payment at any time before or after the due date.

As described above, in some examples, the service provider can associate the transaction data with a first data structure that is associated with the first lending product.

At operation 1204, the service provider can determine a balance and a due date for repaying the balance associated with the first lending product. In at least one example, the service provider can use the transaction data to determine a total cost of item(s) purchased using the payment instrument. In at least one example, the total cost can represent a spending balance, which, when associated with a designated period of time (e.g., month), can be called a monthly spend, as described above.

In at least one example, the service provider can determine a due date for repaying the balance. In some examples, the due date can correspond to a date on a calendar, an end of a month, etc. In some examples, the due date can be determined based at least in part on data associated with the merchant and/or other merchants associated with the service provider.

At operation 1206, the service provider can determine whether the balance is paid in full by the due date. In at least one example, if the balance is paid in full by the due date, the service provider can replenish available credit, in the amount of the balance as repaid, as illustrated at operation 1208, and can return to operation 1202. If the balance is not paid in full by the due date, the service provider can determine whether the merchant opts to transfer the unpaid balance to the second lending product, as illustrated at operation 1210. In some examples, a merchant can be presented with an option to transfer the unpaid portion of the balance from the first lending product to a second lending product, for example via a user interface of a merchant device. In at least one example, responsive to an input received via the merchant device indicating an intent to transfer the unpaid balance to the second lending product, the service provider can roll a portion of the balance into a second lending product. In an alternative example, the service provider can roll the unpaid balance to the second lending product automatically (i.e., without input from the merchant).

In at least one example, the service provider can determine term(s) associated with the second lending product based at least in part on the merchant opting to transfer the unpaid balance to the second lending product. In at least one example, the service provider can determine such term(s) based at least in part on the existing extra time balance (if applicable), the amount intended to be transferred to the second lending product, data associated with the merchant, or the like. In at least one example, the terms can include a "hold rate" indicating a percentage of revenue from payment processed by the service provider to withhold, a length of time for repayment, a fee associated with rolling the unpaid balance to the second lending product, and/or the like.

At operation 1212, the service provider can determine whether a minimum payment was received. In some examples, the user may not be permitted to transfer the portion of the balance unless a condition is satisfied. In at least one example, such a condition can be a minimum payment. In at least one example, the service provider can determine the minimum payment based at least in part on an existing extra time balance (if applicable), the amount intended to be transferred to the second lending product, a past due balance (e.g., previous minimum payments that are unpaid), data associated with the merchant, and/or the like. In some examples, the amount of the minimum payment can increase or decrease based at least in part on an existing extra time balance (if applicable), the amount intended to be transferred to the second lending product, a past due balance (e.g., previous minimum payments that are unpaid), data associated with the merchant, and/or the like.

If the merchant does not opt to transfer the unpaid balance to the second lending product and/or the minimum payment is not received, the service provider can associate a past due indication with an account associated with the payment instrument, as illustrated in operation 1214. In at least one example, the past due indication can indicate that the account associated with the payment instrument is in a delinquent state. In some examples, a past due indicator can affect terms associated with the first lending product (e.g., lower the spending limit, increase a minimum payment, etc.) and/or can cause the service provider to freeze the account until payment is made. In some examples, the service provider can send electronic communications to accounts associated with a past due indicator, for example, to request payment, indicate repayment options, offer information regarding return to good standing (i.e., not past due), collection outreach, or otherwise provide information to the service provider.

At operation 1216, the service provider can associate an unpaid balance with the second lending product. As described above, in some examples, the second lending product can be associated with a second data structure. In at least one example, the service provider can associate the balance rolled over to the second lending product with the second data structure associated with the second lending product. As described above, the portion of the unpaid balance that is rolled into a second lending product, can be associated with an extra time balance. In some examples, the service provider can assess a fee for transferring the portion of the unpaid balance to the second lending product. In some examples, the fee can be a flat fee for all merchants. In other examples, the fee can be determined based at least in part on data associated with the merchant and/or other merchants (e.g., risk-based). In some examples, the merchant can set the fee.

As described above, in some instances, the second lending product is offered by a financial institution different and distinct from the one offering the first lending product. Accordingly, the service provider can establish the first data structure and connection with the first financial institution separate from the second data structure and connection with the second financial institution, however the service provider can internally maintain the association between the two data structures and the merchant. The connections with the financial institutions are customized based in part on the characteristics of the merchant platform, financial institution's platform, and/or the network. For example, each of the connections may involve customization of specific API interfaces to communicate with the financial institution's platform and the merchant platforms. Furthermore, the service provider may also generate specific API calls to the API interfaces of the financial institution's platform and/or the merchant platforms. The service provider also facilitates compliance of security and data requirements of such platforms. To that end, the connections created by the service provider are secure and independent of the other connections that exist between the merchant and the service provider.

At operation 1218, the service provider can facilitate repayment of the unpaid balance using a second repayment mechanism. As described above, the portion of the unpaid balance that is rolled into a second lending product, can be associated with an extra time balance. In some examples, the repayment mechanism associated with the second lending product can be different than the repayment mechanism associated with the first lending product. As described above, the repayment mechanism associated with the second lending product can include (i) repayment using a percentage of revenue from payments processed by the service provider on behalf of the merchant, (ii) a loan offered by the service provider, (iii) a loan offered by a third party, or the like. Additional details associated with repayment using a percentage of revenue from payments processed by the service provider on behalf of the merchant are described below with reference to FIG. 13. In examples where the second repayment mechanism is a loan, the loan can be issued and can enter repayment, which can be managed via the service provider or the third party offering the loan. As the merchant repays the unpaid balance (e.g., the extra time balance), the unpaid balance can decrease and available credit can increase.

Figure 13:
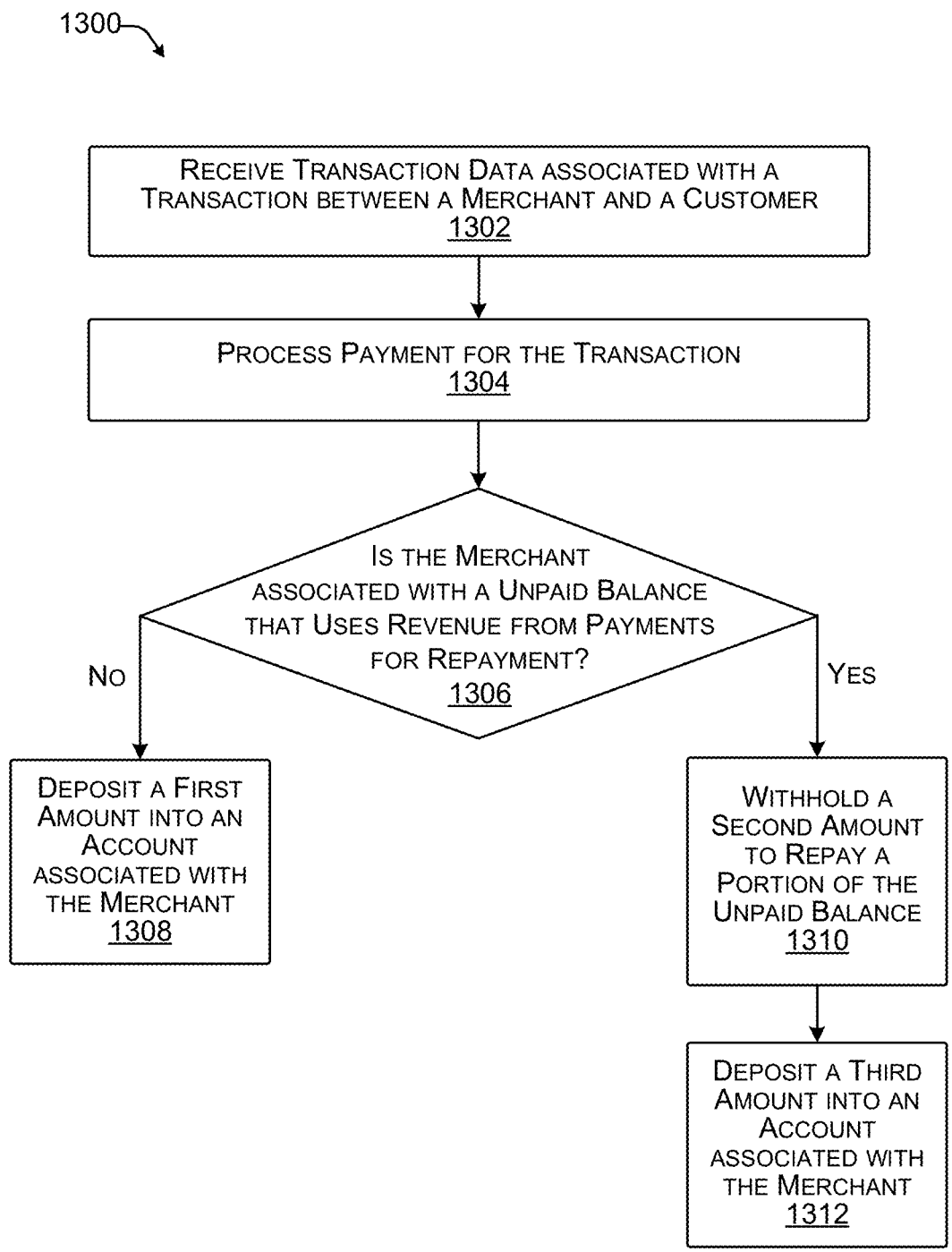
FIG. 13 illustrates an example process for using revenue from payments processed on behalf of a merchant for repaying a balance associated with a lending product, as described herein.

FIG. 13 illustrates an example process 1300 for using proceeds from transactions processed on behalf of a merchant for repaying a lending product, as described herein.

At operation 1302, the service provider can receive transaction data associated with a transaction between a merchant and a customer. In at least one example, the service provider can receive data associated with a transaction, which can include payment data, user authentication data, purchase amount information, point-of-purchase information (e.g., item(s) purchased, date of purchase, time of purchase, etc.), etc. In some examples, the transaction data can be received by the service provider from an application installed on a merchant device of the merchant (e.g., that specially configures the merchant device as a POS terminal, as described below). In some examples, payment data associated with transaction data can be associated with a payment instrument of the customer.

In some examples, the payment data can be received via a reader device associated with a merchant device of the merchant and/or via a payment user interface presented via the merchant device. In some examples, the payment data can be received via a reader device associated with a customer device of the customer and/or via a payment user interface presented via the customer device. In some examples, the service provider can receive transaction data from other payment mechanisms such as online payment portals, or the like.

At operation 1304, the service provider can process payment for the transaction. In at least one example, the service provider can transmit requests (e.g., authorization, capture, settlement, etc.) to payment service server computing device(s) associated with a payment service to process payment for the transaction. That is, the service provider can receive payment data and can send one or more requests (e.g., authorization, capture, settlement, etc.) to a payment service to process payment for a transaction using the payment data. The payment service can respond to such requests and the service provider can communicate a success or a failure to the merchant device and/or the customer device. That is, the service provider can be an intermediary such that it receives payment data, transmits the payment data to a payment service for the payment service to determine whether the payment data is authorized for the transaction, receives a response from the payment service, and communicates such a response to the merchant device and/or the customer device.

At operation 1306, the service provider can determine whether the merchant is associated with an unpaid balance that utilizes revenue from payments for repayment. That is, the service provider can access an account of the merchant to determine if the merchant is associated with a loan product that has an unpaid balance and is associated with a repayment mechanism that utilizes a portion of revenue from payments processed by the service provider to repay the extra time balance. If the merchant is not associated with an unpaid balance that is associated with repayment from revenue from payments processed by the service provider, the service provider can deposit a first amount into an account associated with the merchant, as illustrated at operation 1308. In such an example, the first amount can correspond to the cost of the transaction less any fees owed to the service provider for processing payment for the transaction.

At operation 1310, the service provider can withhold a second amount to repay a portion of the unpaid balance. That is, if the merchant is associated with an unpaid balance that is associated with repayment from revenue from payments processed by the service provider, the service provider can withhold an amount from deposit into the account associated with the merchant. In such an example, the second amount can be determined based at least in part on terms associated with the loan product and/or repayment mechanism. That is, the loan product can be associated with a repayment mechanism that withholds revenue from payments processed by the service provider. The amount withheld (e.g., the second amount or "hold rate") can be determined based at least in part on data associated with the merchant, an existing extra time balance (if applicable), the amount transferred to the lending product (from another lending product), an amount of time for repayment, and/or the like. For example, the service provider can determine the hold rate based at least in part on a predicted GPV, a current extra time balance, and a repayment period. In some examples, the hold rate can change over time (e.g., based on additional unpaid balance(s) being rolled into the loan product).

At operation 1312, the service provider can deposit a third amount into an account associated with the merchant. In at least one example, the third amount can correspond to the amount of the transaction, less the second amount and any fees owed to the service provider for processing payment for the transaction.

FIG. 14 illustrates an example environment 1400. The environment 1400 includes server computing device(s) 1402 that can communicate over a network 1404 with user devices 1406 (which, in some examples can be merchant devices 1408 (individually, 1408(A)-1408(N))) and/or server computing device(s) 1410 associated with third-party service provider(s). The server computing device(s) 1402 can be associated with a service provider 1412, which can correspond to the service provider described above, that can provide one or more services for the benefit of users 1414, as described below. Actions attributed to the service provider 1412 can be performed by the server computing device(s) 1402. That is, actions attributed to the service provider in FIGS. 1-13 can be performed by the server computing device(s) 1402 described below.

As described above, the service provider 1412 can facilitate the offering and/or management of lending products with different repayment mechanisms. In an example, the service provider 1412 can provide a user (e.g., of the users 1414) with a payment instrument (e.g., a credit card) that can be associated with a spending limit (e.g., available credit). The user can use the payment instrument for making purchases. In an example, each month (e.g., calendar month), the user can spend up to their available spending limit. A sum of each of the purchases can be used to determine a balance associated with the payment instrument. The balance can represent the amount borrowed by the user and owed to the lender (e.g., the service provider 1412). At the end of the month, a service provider 1412 can notify the user that they have a payment due and, if the user repays a portion of a balance associated with the payment instrument by the date it is due (i.e., due date), the available credit can be replenished by the amount of the payment. If the user pays off the entire balance due on the due date, the user can avoid a fee and keep the account associated with the payment instrument in a non-delinquent state.

In some examples, however, a user may need additional time to pay off the entire balance that is due on the due date. Techniques described herein enable the user to transition the balance from being associated with the first lending product (e.g., as described above) to a second lending product, wherein the second lending product is associated with a different repayment mechanism than the first lending product. In at least one example, the user can pay a minimum payment in association with the first lending product and can transfer the remaining balance to the second lending product, which enables the user more time to repay the remaining balance without the account becoming delinquent. In at least one example, the first lending product can be associated with a first repayment mechanism, such as automatic withdrawal from a linked bank account, and the second lending product can be associated with a second repayment mechanism that is different than the first repayment mechanism. For example, the second repayment mechanism can be associated with (i) repayment using a percentage of revenue from payments processed by the service provider 1412 on behalf of the user, (ii) a loan offered by the service provider 1412, (iii) a loan offered by a third party, or the like.

As described above, in at least one example, the service provider 1412 can provide services via a distributed, network-based system, as described in FIG. 14 as the environment 1400. As described above, the environment 1400 can leverage unconventional lending products to enable merchants to remedy short-term cash flow challenges they often face. Often merchants that have low cash flow and/or reserves struggle to access fast, affordable credit or are unable to get credit entirely. Techniques described herein leverage data determined based on interactions between merchants and customers within a merchant ecosystem to enable higher approval rates, higher spending limits, more time to repay, avoidance of personal guarantees, effortless repayment, and reduced or no fees. That is, techniques described herein leverage data determined and/or transmitted via the distributed, network-based system (e.g., the merchant ecosystem) to determine which merchants to approve for individual lending products and/or terms associated with the lending products (e.g., spending limits, time for repayment, terms of repayment, fees associated with the lending products, etc.). As such, techniques described herein offer more access to lending products than conventional lending products at least because the environment 1400 is able to access data that can be analyzed via machine-trained models to intelligently determine (i) which users quality for individual of the lending products described herein and/or (ii) terms associated with repayment mechanisms associated therewith. In some examples, such decision making can be performed regularly (e.g., at a particular frequency, after a lapse of a period of time, etc.) such that eligible users and/or terms of repayment mechanisms are updated regularly as well. In some examples, techniques described herein help merchants avoid paying fees for longer-term credit than they need, and further reduces fees with interchange revenue.

As described above, techniques described herein can leverage the data determined based on interactions between merchants and customers within the distributed, network-based system (e.g., the environment 1400) to understand merchants and to determine which merchants to offer lending products and on which terms. That is, techniques described herein can use machine-trained models to intelligently determine which merchants to offer lending products and on what terms, and in some examples, can offer such lending product to such merchants via existing channels at little to no cost to the service provider 1412. In some examples, eligibility and spending limits can be based on forecasted GPVs (e.g., volume of payments that merchants are likely to use the service provider 1412 for processing) and risk scores determined based at least in part on the data determined based on interactions between merchants and customers. In some examples, identified merchants that are determined to be prequalified for lending products can be proactively targeted through electronic communications (e.g., email, text message, in-app notification, etc.) and/or via user interfaces that such merchants use to manage their information and/or interactions with the service provider 1412 (e.g., a dashboard). That is, techniques described herein offer personalized and/or customized lending products to enable flexibility with respect to borrowing money and/or repayment of such borrowed money, thereby enabling higher approval rates, higher spending limits, more time to repay, avoidance of personal guarantees, effortless repayment, and reduced or no fees. This is an improvement to existing one-size-fits-all lending products and/or repayment schemes.

In some examples, the service provider 1412 can leverage data associated with existing merchants to make recommendations for a new merchant. That is, in such examples, the service provider 1412 can leverage data associated with other merchants, which in some examples can be similar to the new merchant, to determine which lending product(s) the new merchant is qualified for and/or the terms associated with such lending product(s), even though the service provider 1412 has little to no information about the new merchant. In additional or alternative examples, the service provider 1412 can leverage data associated with other merchants, which in some examples, can be similar to a merchant, to determine which lending product(s) the new merchant is qualified for and/or the terms associated with such lending product(s). That is, as described above, techniques described herein offer personalized and/or customized lending products to enable flexibility with respect to borrowing money and/or repayment of such borrowed money, thereby enabling higher approval rates, higher spending limits, more time to repay, avoidance of personal guarantees, effortless repayment, and reduced or no fees. This is an improvement to existing one-size-fits-all lending products and/or repayment schemes.

Techniques described herein offer reassurances for lenders. For example, by offering both lending services as well as payment processing services, the service provider 1412 can prioritize repayment to the service provider 1412 prior to repayment of merchants when necessary to repay a debt owed to the service provider 1412. That is, repayment can be nearly guaranteed by prioritizing repayment to the service provider 1412 prior to the merchants. Further, by enabling merchants to utilize sales revenue to repay balances, such balances can be repaid faster as merchants grow faster. This can be a benefit for both the merchant and the service provider 1412. Further, as described above, in some examples, payment processing data can be utilized by the service provider 1412 to modify terms associated with lending products offered by the service provider 1412. That is, by integrating lending services (e.g., of lending products)

with payment processing services, techniques described herein can enable flexibility with respect to borrowing money and/or repayment of such borrowed money, thereby enabling higher approval rates, higher spending limits, more time to repay, avoidance of personal guarantees, effortless repayment, and reduced or no fees. This is an improvement to existing one-size-fits-all lending products and/or repayment schemes.

The environment 1400 can include a plurality of user devices 1406, as described above. Each one of the plurality of user devices 1406 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1414. The users 1414 can be referred to as customers, buyers, merchants, sellers, borrowers, employees, employers, payors, payees, couriers and so on. The users 1414 can interact with the user devices 1406 via user interfaces presented via the user devices 1406. In at least one example, a user interface can be presented via a web browser, or the like. In other examples, a user interface can be presented via an application, such as a mobile application or desktop application, which can be provided by the service provider 1412 or which can be an otherwise dedicated application. In some examples, individual of the user devices 1406 can have an instance or versioned instance of an application, which can be downloaded from an application store, for example, which can present the user interface(s) described herein. In at least one example, a user 1414 can interact with the user interface via touch input, spoken input, or any other type of input.

As described above, in at least one example, the users 1414 can include merchants 1416 (individually, 1416(A)-1416(N)). In an example, the merchants 1416 can operate respective merchant devices 1408, which can be user devices 1406 configured for use by merchants 1416. For the purpose of this discussion, a "merchant" can be any entity that offers items (e.g., goods or services) for purchase or other means of acquisition (e.g., rent, borrow, barter, etc.). The merchants 1416 can offer items for purchase or other means of acquisition via brick-and-mortar stores, mobile stores (e.g., pop-up shops, food trucks, etc.), online stores, combinations of the foregoing, and so forth. In some examples, at least some of the merchants 1416 can be associated with a same entity but can have different merchant locations and/or can have franchise/franchisee relationships. In additional or alternative examples, the merchants 1416 can be different merchants. That is, in at least one example, the merchant 1416(A) is a different merchant than the merchant 1416(B) and/or the merchant 1416(C).

For the purpose of this discussion, "different merchants" or "other merchants" can refer to two or more unrelated merchants. "Different merchants" or "other merchants" therefore can refer to two or more merchants that are different legal entities (e.g., natural persons and/or corporate persons) that do not share accounting, employees, branding, etc. "Different merchants" or "other merchants," as used herein, have different names, employer identification numbers (EIN)s, lines of business (in some examples), inventories (or at least portions thereof), and/or the like. Thus, the use of the term "different merchants" or "other merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1408 can have an instance of a POS application 1418 stored thereon. The POS application 1418 can configure the merchant device 1408 as a POS terminal, which enables the merchant 1416(A) to interact with one or more customers 1420. As described above, the users 1414 can include customers, such as the customers 1420 shown as interacting with the merchant 1416(A). For the purpose of this discussion, a "customer" can be any entity that acquires items (e.g., goods or services) from merchants. While only two customers 1420 are illustrated in FIG. 14, any number of customers 1420 can interact with the merchants 1416. Further, while FIG. 14 illustrates the customers 1420 interacting with the merchant 1416(A), the customers 1420 can interact with any of the merchants 1416.

In at least one example, interactions between the customers 1420 and the merchants 1416 that involve the exchange of funds (from the customers 1420) for items (from the merchants 1416) can be referred to as "transactions." In at least one example, the POS application 1418 can determine transaction data associated with the transactions. Transaction data can include payment information, which can be obtained from a reader device 1422 associated with the merchant device 1408(A), user authentication data, purchase amount information, point-of-purchase information (e.g., item(s) purchased, date of purchase, time of purchase, etc.), etc. The POS application 1418 can send transaction data to the server computing device(s) 1402. Furthermore, the POS application 1418 can present a UI to enable the merchant 1416(A) to interact with the POS application 1418 and/or the service provider 1412 via the POS application 1418.

In at least one example, the merchant device 1408(A) can be a special-purpose computing device configured as a POS terminal (via the execution of the POS application 1418). In at least one example, the POS terminal may be connected to a reader device 1422, which is capable of accepting a variety of payment instruments, such as credit cards, debit cards, gift cards, short-range communication based payment instruments, and the like, as described below. In at least one example, the reader device 1422 can plug in to a port in the merchant device 1408(A), such as a microphone port, a headphone port, an audio-jack, a data port, or other suitable port. In additional or alternative examples, the reader device 1422 can be coupled to the merchant device 1408(A) via another wired or wireless connection, such as via a Bluetooth®, BLE, and so on. Additional details are described below with reference to FIG. 15. In some examples, the reader device 1422 can read information from alternative payment instruments including, but not limited to, wristbands and the like.

In some examples, the reader device 1422 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1422, and communicate with the server computing device(s) 1402, which can provide, among other services, a payment processing service. The server computing device(s) 1402 associated with the service provider 1412 can communicate with server computing device(s) 1410, as described below. In this manner, the POS terminal and reader device 1422 may collectively process transaction(s) between the merchants 1416 and customers 1420. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1422 of the POS system 1424 are shown as separate devices, in additional or alternative examples, the POS terminal and the reader device 1422 can be part of a single device. In some examples, the reader device 1422 can have a display integrated therein for presenting information to the customers 1420. In additional or alternative examples, the POS terminal can have a display integrated therein for presenting information to the customers 1420. POS systems, such as the POS system 1424, may be mobile, such that POS terminals and reader devices may process transactions in disparate locations across the world. POS systems can be used for processing card-present transactions and card-not-present (CNP) transactions, as described below.

A card-present transaction is a transaction where both a customer 1420 and his or her payment instrument are physically present at the time of the transaction. Card-present transactions may be processed by swipes, dips, taps, or any other interaction between a physical payment instrument (e.g., a card), or otherwise present payment instrument, and a reader device 1422 whereby the reader device 1422 is able to obtain payment data from the payment instrument. A swipe is a card-present transaction where a customer 1420 slides a card, or other payment instrument, having a magnetic strip through a reader device 1422 that captures payment data contained in the magnetic strip. A dip is a card-present transaction where a customer 1420 inserts a payment instrument having an embedded microchip (i.e., chip) into a reader device 1422 first. The dipped payment instrument remains in the payment reader until the reader device 1422 prompts the customer 1420 to remove the card, or other payment instrument. While the payment instrument is in the reader device 1422, the microchip can create a one-time code which is sent from the POS system 1424 to the server computing device(s) 1410 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1420 may tap or hover his or her payment instrument (e.g., card, electronic device such as a smart phone running a payment application, etc.) over a reader device 1422 to complete a transaction via short-range communication (e.g., NFC, RFID, Bluetooth®, BLE, etc.). Short-range communication enables the payment instrument to exchange information with the reader device 1422. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1424, the server computing device(s) 1402, and/or the server computing device(s) 1410 may exchange payment information and transaction data to determine whether transactions are authorized. For example, the POS system 1424 may provide encrypted payment data, user authentication data, purchase amount information, point-of-purchase information, etc. (collectively, transaction data) to server computing device(s) 1402 over the network(s) 1404. The server computing device(s) 1402 may send the transaction data to the server computing device(s) 1410. As described above, in at least one example, the server computing device(s) 1410 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1410 associated therewith) can send a fund transfer request to a server computing device of a card payment network (e.g., Mastercard®, VISA®, etc.) to determine whether the transaction is authorized or deficient. In at least one example, the service provider 1412 can serve as an acquirer and connect directly with the card payment network.

The card payment network (e.g., the server computing device(s) 1410 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1410 associated therewith) can make a determination as to whether the customer has the capacity to absorb the relevant charge associated with the payment transaction. In at least one example, the service provider 1412 can serve as an issuer and/or can partner with an issuer. The transaction is either approved or rejected by the issuer and/or the card payment network (e.g., the server computing device(s) 1410 associated therewith), and a payment authorization message is communicated from the issuer to the POS device via a path opposite of that described above, or via an alternate path.

As described above, the server computing device(s) 1410, which can be associated with payment service provider(s), may determine whether the transaction is authorized based on the transaction data, as well as information relating to parties to the transaction (e.g., the customer 1420 and/or the merchant 1416(A)). The server computing device(s) 1410 may send an authorization notification over the network(s) 1404 to the server computing device(s) 1402, which may send the authorization notification to the POS system 1424 over the network(s) 1404 to indicate whether the transaction is authorized. The server computing device(s) 1402 may also transmit additional information such as transaction identifiers to the POS system 1424. In one example, the server computing device(s) 1402 may include a merchant application and/or other functional components for communicating with the POS system 1424 and/or the server computing device(s) 1410 to authorize or decline transactions.

Based on the authentication notification that is received by the POS system 1424 from server computing device(s) 1402, the merchant 1416(A) may indicate to the customer 1420 whether the transaction has been approved. In some examples, approval may be indicated at the POS system 1424, for example, at a display of the POS system 1424. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1412 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1414 can access all of the services of the service provider 1412. In other examples, the users 1414 can have gradated access to the services, which can be based on risk tolerance, IDV outputs, subscriptions, and so on. In at least one example, access to such services can be availed to the merchants 1416 via the POS application 1418. In additional or alternative examples, each service can be associated with its own access point (e.g., application, web browser, etc.).

The service provider 1412 can offer payment processing services for processing payments on behalf of the merchants 1416, as described above. For example, the service provider 1412 can provision payment processing software, payment processing hardware and/or payment processing services to merchants 1416, as described above, to enable the merchants 1416 to receive payments from the customers 1420 when conducting transactions with the customers 1420. For instance, the service provider 1412 can enable the merchants 1416 to receive cash payments, payment card payments, and/or electronic payments from customers 1420 for transactions and the service provider 1412 can process transactions on behalf of the merchants 1416.

As the service provider 1412 processes transactions on behalf of the merchants 1416, the service provider 1412 can maintain accounts or balances for the merchants 1416 in one or more ledgers. For example, the service provider 1412 can analyze transaction data received for a transaction to determine an amount of funds owed to a merchant 1416(A) for the transaction. In at least one example, such an amount can be a total purchase price less fees charged by the service provider 1412 for providing the payment processing services. Based on determining the amount of funds owed to the merchant 1416(A), the service provider 1412 can deposit funds into an account of the merchant 1416(A). The account can have a stored balance, which can be managed by the service provider 1412. The account can be different from a conventional bank account at least because the stored balance is managed by a ledger of the service provider 1412 and the associated funds are accessible via various withdrawal channels including, but not limited to, scheduled deposit, same-day deposit, instant deposit, and a linked payment instrument.

A scheduled deposit can occur when the service provider 1412 transfers funds associated with a stored balance of the merchant 1416(A) to a bank account of the merchant 1416(A) that is held at a bank or other financial institution (e.g., associated with the server computing device(s) 1410). Scheduled deposits can occur at a prearranged time after a transaction is funded, which can be a business day after the transaction occurred, or sooner or later. In some examples, the merchant 1416(A) can access funds prior to a scheduled deposit. For instance, the merchant 1416(A) may have access to same-day deposits (e.g., wherein the service provider 1412 deposits funds from the stored balance to a linked bank account of the merchant on a same day as transaction, in some examples prior to the transaction being funded) or instant deposits (e.g., wherein the service provider 1412 deposits funds from the stored balance to a linked bank account of the merchant on demand, such as responsive to a request). Further, in at least one example, the merchant 1416(A) can have a payment instrument that is linked to the stored balance that enables the merchant to access the funds without first transferring the funds from the account managed by the service provider 1412 to the bank account of the merchant 1416(A).

In at least one example, the service provider 1412 may provide inventory management services. That is, the service provider 1412 may provide inventory tracking and reporting. Inventory management services may enable the merchant 1416(A) to access and manage a database storing data associated with a quantity of each item that the merchant 1416(A) has available (i.e., an inventory). Furthermore, in at least one example, the service provider 1412 can provide catalog management services to enable the merchant 1416(A) to maintain a catalog, which can be a database storing data associated with items that the merchant 1416(A) has available for acquisition (i.e., catalog management services). In at least one example, the catalog may include a plurality of data items and a data item of the plurality of data items may represent an item that the merchant 1461(A) has available for acquisition. The service provider 1412 can offer recommendations related to pricing of the items, placement of items on the catalog, and multi-party fulfilment of the inventory.

In at least one example, the service provider 1412 can provide business banking services, which allow the merchant 1416(A) to track deposits (from payment processing and/or other sources of funds) into an account of the merchant 1416(A), payroll payments from the account (e.g., payments to employees of the merchant 1416(A)), payments to other merchants (e.g., business-to-business) directly from the account or from a linked debit card, withdrawals made via scheduled deposit and/or instant deposit, etc. Furthermore, the business banking services can enable the merchant 1416(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1416 to visualize their cash flow to track their financial health, set aside money for upcoming obligations (e.g., savings), organize money around goals, etc.

In at least one example, the service provider 1412 can provide financing services and products, such as via business loans, consumer loans, fixed term loans, flexible term loans, and the like. In at least one example, the service provider 1412 can utilize one or more risk signals to determine whether to extend financing offers and/or terms associated with such financing offers.

In at least one example, the service provider 1412 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1412 can offer different types of capital loan products. For instance, in at least one example, the service provider 1412 can offer a daily repayment loan product, wherein a capital loan is repaid daily, for instance, from a portion of transactions processed by the payment processing service on behalf of the borrower. Additionally and/or alternatively, the service provider 1412 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider 1412 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1416. The service provider 1412 can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1412 (e.g., from payments owed to the merchant from payments processed on behalf of the merchant, funds transferred to the merchant, etc.). The service provider 1412 can offer specific financial products, such as payment instruments, tied specifically to the loan products. For example, in one implementation, the service provider 1412 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1412 can provide web-development services, which enable users 1414 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1416. In at least one example, the service provider 1412 can recommend and/or generate content items to supplement omni-channel presences of the merchants 1416. That is, if a merchant of the merchants 1416 has a web page, the service provider 1412—via the web-development or other services—can recommend and/or generate additional content items to be presented via other channel(s), such as social media, email, etc.

Furthermore, the service provider 1412 can provide payroll services to enable employers to pay employees for work performed on behalf of employers. In at least one example, the service provider 1412 can receive data that includes time worked by an employee (e.g., through imported timecards and/or POS interactions), sales made by the employee, gratuities received by the employee, and so forth. Based on such data, the service provider 1412 can make payroll payments to employee(s) on behalf of an employer via the payroll service. For instance, the service provider 1412 can facilitate the transfer of a total amount to be paid out for the payroll of an employee from the bank of the employer to the bank of the service provider 1412 to be used to make payroll payments. In at least one example, when the funds have been received at the bank of the service provider 1412, the service provider 1412 can pay the employee, such as by check or direct deposit, often a day, a week, or more after when the work was actually performed by the employee. In additional or alternative examples, the service provider 1412 can enable employee(s) to receive payments via same-day or instant deposit based at least in part on risk and/or reliability analyses performed by the service provider 1412.

Moreover, in at least one example, the service provider 1412 can provide employee management services for managing schedules of employees. Further, the service provider 1412 can provide appointment services for enabling users 1414 to set schedules for scheduling appointments and/or users 1414 to schedule appointments.

In some examples, the service provider 1412 can provide restaurant management services to enable users 1414 to make and/or manage reservations, to monitor front-of-house and/or back-of-house operations, and so on. In such examples, the merchant device(s) 1408 and/or server computing device(s) 1402 can be configured to communicate with one or more other computing devices, which can be located in the front-of-house (e.g., POS device(s)) and/or back-of-house (e.g., kitchen display system(s) (KDS)). In at least one example, the service provider 1412 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1412 can provide fulfilment services, which can use couriers for delivery, wherein couriers can travel between multiple locations to provide delivery services, photography services, etc.

Couriers can be users 1414 who can travel between locations to perform services for a requesting user 1414 (e.g., deliver items, capture images, etc.). In some examples, the courier can receive compensation from the service provider 1412. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1412 can receive requests for courier services, automatically assign the requests to active couriers, and communicate dispatch instructions to couriers via user interface (e.g., application, web browser, or other access point) presented via respective devices 1406.

In some examples, the service provider 1412 can provide omni-channel fulfillment services. For instance, if a customer places an order with a merchant and the merchant cannot fulfill the order because one or more items are out of stock or otherwise unavailable, the service provider 1412 can leverage other merchants and/or sales channels that are part of the platform of the service provider 1412 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider 1412 can enable conversational commerce via conversational commerce services, which can use one or more machine learning mechanisms to analyze messages exchanged between two or more users 1414, voice inputs into a virtual assistant or the like, to determine intents of user(s) 1412. In some examples, the service provider 1412 can utilize determined intents to automate customer service, offer promotions, provide recommendations, or otherwise interact with customers in real-time. In at least one example, the service provider 1412 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, the service provider 1412 can provide a peer-to-peer payment service that enables peer-to-peer payments between two or more users 1414. In at least one example, the service provider 1412 can communicate with instances of a payment application (or other access point) installed on devices 1406 configured for operation by users 1414. In an example, an instance of the payment application executing on a first device operated by a payor can send a request to the service provider 1412 to transfer an amount of funds (e.g., fiat currency or non-fiat currency such as cryptocurrency, securities, and related assets) from an account of the payor to an account of a payee (e.g., a peer-to-peer payment). The service provider 1412 can facilitate the transfer and can send a notification to an instance of the payment application executing on a second mobile device operated by the payee that the transfer is in process (or has been completed). In some examples, the service provider 1412 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1412 funds the request to payee on behalf of the payor, to speed up the transfer process and compensate for any lags that may be attributed to payor's financial network.

In some implementations, the service provider 1412 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1406.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1412. For instance, the service provider 1412 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1406 (e.g., mobile device or conventional personal computer (PC)) based on instructions transmitted to and from the server computing device(s) 1402 (which, in such an example can be called a "messaging server"). In some instances, the messaging application can include a payment application with messaging capability that enables users of the payment application to communicate with one another. In such instances, the payment application can be executed on the a user device 1406 based on instructions transmitted to and from the server computing device(s) 1402 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1412 can generate the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1414 may be new to the service provider 1412 such that the user 1414 that has not registered (e.g., subscribed to receive access to one or more services offered by the service provider) with the service provider 1412. The service provider 1412 can offer onboarding services for registering a potential user 1414 with the service provider 1412. In some examples, onboarding can involve presenting various questions, prompts, and the like to a potential user 1414 to obtain information that can be used to generate a profile for the potential user 1414. In at least one example, the service provider 1412 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1414 providing all necessary information, the potential user 1414 can be onboarded to the service provider 1412. In such an example, any limited or short-term access to services of the service provider 1412 can be transitioned to more permissive (e.g., less limited) or longer-term access to such services.

The service provider 1412 can be associated with IDV services, which can be used by the service provider 1412 for compliance purposes and/or can be offered as a service, for instance to third-party service providers (e.g., associated with the server computing device(s) 1410). That is, the service provider 1412 can offer IDV services to verify the identity of users 1414 seeking to use or using their services. Identity verification requires a customer (or potential customer) to provide information that is used by compliance departments to prove that the information is associated with an identity of a real person or entity. In at least one example, the service provider 1412 can perform services for determining whether identifying information provided by a user 1414 accurately identifies the customer (or potential customer) (i.e., Is the customer who they say they are?).

The service provider 1412 is capable of providing additional or alternative services and the services described above are offered as a sampling of services. In at least one example, the service provider 1412 can exchange data with the server computing device(s) 1410 associated with third-party service providers. Such third-party service providers can provide information that enables the service provider 1412 to provide services, such as those described above. In additional or alternative examples, such third-party service providers can access services of the service provider 1412. That is, in some examples, the third-party service providers can be subscribers, or otherwise access, services of the service provider 1412.

Techniques described herein can be configured to operate in both real-time/online and offline modes. "Online" modes refer to modes when devices are capable of communicating with the service provider 1412 (e.g., the server computing device(s) 1402) and/or the server computing device(s) 1410 via the network(s) 1404. In some examples, the merchant device(s) 1408 are not capable of connecting with the service provider 1412 (e.g., the server computing device(s) 1402) and/or the server computing device(s) 1410, due to a network connectivity issue, for example. In additional or alternative examples, the server computing device(s) 1402 are not capable of communicating with the server computing device(s) 1410 due to network connectivity issue, for example. In such examples, devices may operate in "offline" mode where at least some payment data is stored (e.g., on the merchant device(s) 1408) and/or the server computing device(s) 1402 until connectivity is restored and the payment data can be transmitted to the server computing device(s) 1402 and/or the server computing device(s) 1410 for processing.

In at least one example, the service provider 1412 can be associated with a hub, such as an order hub, an inventory hub, a fulfillment hub and so on, which can enable integration with one or more additional service providers (e.g., associated with the additional server computing device(s) 1410). In some examples, such additional service providers can offer additional or alternative services and the service provider 1412 can provide an interface or other computer-readable instructions to integrate functionality of the service provider 1412 into the one or more additional service providers.

Techniques described herein are directed to services provided via a distributed system of user devices 1406 that are in communication with one or more server computing devices 1402 of the service provider 1412. That is, techniques described herein are directed to a specific implementation—or, a practical application—of utilizing a distributed system of user devices 1406 that are in communication with one or more server computing devices 1402 of the service provider 1412 to perform a variety of services, as described above. The unconventional configuration of the distributed system described herein enables the server computing device(s) 1402 that are remotely-located from end-users (e.g., users 1414) to intelligently offer services based on aggregated data associated with the end-users, such as the users 1414 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1412, and those outside of the control of the service provider 1412, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1414 and user devices 1406. Furthermore, such features are changed dynamically based on the profiles of the users involved interacting with the GUIs. As such, techniques described herein are directed to improvements to computing systems.

FIG. 15 depicts an illustrative block diagram illustrating a system 1500 for performing techniques described herein. The system 1500 includes a user device 1502, that communicates with server computing device(s) (e.g., server(s) 1504) via network(s) 1506 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). In at least one example, the server(s) 1504 can correspond to the server computing device(s) 1402, which are associated with the service provider 1412, as described above with reference to FIG. 14. While a single user device 1502 is illustrated, in additional or alternate examples, the system 1500 can have multiple user devices, as described above with reference to FIG. 14.

As described above with reference to FIG. 14, the service provider 1412 can facilitate the offering and/or management of lending products with different repayment mechanisms. In an example, the service provider 1412 can provide a user with a payment instrument (e.g., a credit card) that can be associated with a spending limit (e.g., available credit). The user can use the payment instrument for making purchases. In an example, each month (e.g., calendar month), the user can spend up to their available spending limit. A sum of each of the purchases can be used to determine a balance associated with the payment instrument. The balance can represent the amount borrowed by the user and owed to the lender (e.g., the service provider 1412). At the end of the month, a service provider 1412 can notify the user that they have a payment due and, if the user repays a portion of a balance associated with the payment instrument by the date it is due (i.e., due date), the available credit can be replenished by the amount of the payment. If the user pays off the entire balance due on the due date, the user can avoid a fee and keep the account associated with the payment instrument in a non-delinquent state.

In some examples, however, a user may need additional time to pay off the entire balance that is due on the due date. Techniques described herein enable the user to transition the balance from being associated with the first lending product (e.g., as described above) to a second lending product, wherein the second lending product is associated with a different repayment mechanism than the first lending product. In at least one example, the user can pay a minimum payment in association with the first lending product and can transfer the remaining balance to the second lending product, which enables the user more time to repay the remaining balance without the account becoming delinquent. In at least one example, the first lending product can be associated with a first repayment mechanism, such as automatic withdrawal from a linked bank account, and the second lending product can be associated with a second repayment mechanism that is different than the first repayment mechanism. For example, the second repayment mechanism can be associated with (i) repayment using a percentage of revenue from payments processed by the service provider 1412 on behalf of the user, (ii) a loan offered by the service provider 1412, (iii) a loan offered by a third party, or the like.

As described above, in at least one example, the service provider 1412 can provide services via a distributed, network-based system, as described in FIG. 15 as the system 1500. As described above, the system 1500 can leverage unconventional lending products to enable merchants to remedy short-term cash flow challenges they often face. Often merchants that have low cash flow and/or reserves struggle to access fast, affordable credit or are unable to get credit entirely. Techniques described herein leverage data determined based on interactions between merchants and customers within a merchant ecosystem to enable higher approval rates, higher spending limits, more time to repay, avoidance of personal guarantees, effortless repayment, and reduced or no fees. That is, techniques described herein leverage data determined and/or transmitted via the distributed, network-based system (e.g., the merchant ecosystem) to determine which merchants to approve for individual lending products and/or terms associated with the lending products (e.g., spending limits, time for repayment, terms of repayment, fees associated with the lending products, etc.). As such, techniques described herein offer more access to lending products than conventional lending products at least because the system 1500 is able to access data that can be analyzed via machine-trained models to intelligently determine (i) which users quality for individual of the lending products described herein and/or (ii) terms associated with repayment mechanisms described herein. In some examples, such decision making can be performed regularly (e.g., at a particular frequency, after a lapse of a period of time, etc.) such that eligible users and/or terms of repayment mechanisms are updated regularly as well. In some examples, techniques described herein help merchants avoid paying fees for longer-term credit than they need, and further reduces fees with interchange revenue.

As described above, techniques described herein can leverage the data determined based on interactions between merchants and customers within the distributed, network-based system (e.g., the system 1500) to understand merchants and to determine which merchants to offer lending products and on which terms. That is, techniques described herein can use machine-trained models to intelligently determine which merchants to offer lending products and on what terms, and in some examples, can offer such lending product to such merchants via existing channels at little to no cost to the service provider 1412. In some examples, eligibility and spending limits can be based on forecasted GPVs (GPV) (e.g., volume of payments that merchants are likely to use the service provider 1412 for processing) and risk scores determined based at least in part on the data determined based on interactions between merchants and customers. In some examples, identified merchants that are determined to be prequalified for lending products can be proactively targeted through electronic communications (e.g., email, text message, in-app notification, etc.) and/or via user interfaces that such merchants use to manage their information and/or interactions with the service provider 1412 (e.g., a dashboard). That is, techniques described herein offer personalized and/or customized lending products to enable flexibility with respect to borrowing money and/or repayment of such borrowed money, thereby enabling higher approval rates, higher spending limits, more time to repay, avoidance of personal guarantees, effortless repayment, and reduced or no fees. This is an improvement to existing one-size-fits-all lending products and/or repayment schemes.

In some examples, the service provider 1412 can leverage data associated with existing merchants to make recommendations for a new merchant. That is, in such examples, the service provider 1412 can leverage data associated with other merchants, which in some examples can be similar to the new merchant, to determine which lending product(s) the new merchant is qualified for and/or the terms associated with such lending product(s), even though the service provider 1412 has little to no information about the new merchant. In additional or alternative examples, the service provider 1412 can leverage data associated with other merchants, which in some examples, can be similar to a merchant, to determine which lending product(s) the new merchant is qualified for and/or the terms associated with such lending product(s). That is, as described above, techniques described herein offer personalized and/or customized lending products to enable flexibility with respect to borrowing money and/or repayment of such borrowed money, thereby enabling higher approval rates, higher spending limits, more time to repay, avoidance of personal guarantees, effortless repayment, and reduced or no fees. This is an improvement to existing one-size-fits-all lending products and/or repayment schemes.

Techniques described herein offer reassurances for lenders. For example, by offering both lending services as well as payment processing services, the service provider 1412 can prioritize repayment to the service provider 1412 prior to repayment of merchants when necessary to repay a debt owed to the service provider 1412. That is, repayment can be nearly guaranteed by prioritizing repayment to the service provider 1412 prior to the merchants. Further, by enabling merchants to utilize sales revenue to repay balances, such balances can be repaid faster as merchants grow faster. This can be a benefit for both the merchant and the service provider 1412. Further, as described above, in some examples, payment processing data can be utilized by the service provider 1412 to modify terms associated with lending products offered by the service provider 1412. That is, by integrating lending services (e.g., of lending products) with payment processing services, techniques described herein can enable flexibility with respect to borrowing money and/or repayment of such borrowed money, thereby enabling higher approval rates, higher spending limits, more time to repay, avoidance of personal guarantees, effortless repayment, and reduced or no fees. This is an improvement to existing one-size-fits-all lending products and/or repayment schemes.

In at least one example, the user device 1502 can be any suitable type of computing device, e.g., portable, semi-portable, semi-stationary, or stationary. Some examples of the user device 1502 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1502 can be any computing device capable of sending communications and performing the functions according to the techniques described herein. The user device 1502 can include devices, e.g., payment card readers, or components capable of accepting payments, as described below.

In the illustrated example, the user device 1502 includes one or more processors 1508, one or more computer-readable media 1510, one or more communication interface(s) 1514, one or more input/output (I/O) devices 1514, a display 1516, and sensor(s) 1518.

In at least one example, each processor can itself comprise one or more processors or processing cores. For example, the processor(s) 1508 can be implemented as one or more microprocessors, microcomputers, microcontrollers, digital signal processors, central processing units, state machines, logic circuitries, and/or any devices that manipulate signals based on operational instructions. In some examples, the processor(s) 1508 can be one or more hardware processors and/or logic circuits of any suitable type specifically programmed or configured to execute the algorithms and processes described herein. The processor(s) 1508 can be configured to fetch and execute computer-readable processor-executable instructions stored in the computer-readable media 1510.

Depending on the configuration of the user device 1502, the computer-readable media 1510 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1510 can include, but is not limited to, RAM, ROM, EEPROM, flash memory, solid-state storage, magnetic disk storage, optical storage, and/or other computer-readable media technology. Further, in some examples, the user device 1502 can access external storage, such as RAID storage systems, storage arrays, network attached storage, storage area networks, cloud storage, or any other medium that can be used to store information and that can be accessed by the processor(s) 1508 directly or through another computing device or network. Accordingly, the computer-readable media 1510 can be computer storage media able to store instructions, modules or components that can be executed by the processor(s) 1508. Further, when mentioned, non-transitory computer-readable media exclude media such as energy, carrier signals, electromagnetic waves, and signals per se.

The computer-readable media 1510 can be used to store and maintain any number of functional components that are executable by the processor(s) 1508. In some implementations, these functional components comprise instructions or programs that are executable by the processor(s) 1508 and that, when executed, implement operational logic for performing the actions and services attributed above to the user device 1502. Functional components stored in the computer-readable media 1510 can include a user interface 1520 to enable users to interact with the user device 1502, and thus the server(s) 1504 and/or other networked devices. In at least one example, the user interface 1520 can be presented via a web browser, or the like. In other examples, the user interface 1520 can be presented via an application, such as a mobile application or desktop application, which can be provided by a service provider 1412 associated with the server(s) 1504, or which can be an otherwise dedicated application. In at least one example, the GUIs described above with reference to FIGS. 1-5 are examples of user interfaces that can be presented via the user device 1502. In at least one example, a user can interact with the user interface via touch input, spoken input, gesture, or any other type of input. The word "input" is also used to describe "contextual" input that may not be directly provided by the user via the user interface 1520. For example, user's interactions with the user interface 1520 are analyzed using, e.g., natural language processing techniques, to determine context or intent of the user, which may be treated in a manner similar to "direct" user input.

Depending on the type of the user device 1502, the computer-readable media 1510 can also optionally include other functional components and data, such as other modules and data 1522, which can include programs, drivers, etc., and the data used or generated by the functional components. In addition, the computer-readable media 1510 can also store data, data structures and the like, that are used by the functional components. Further, the user device 1502 can include many other logical, programmatic and physical components, of which those described are merely examples that are related to the discussion herein.

In at least one example, the computer-readable media 1510 can include additional functional components, such as an operating system 1544 for controlling and managing various functions of the user device 1502 and for enabling basic user interactions.

The communication interface(s) 1514 can include one or more interfaces and hardware components for enabling communication with various other devices, such as over the network(s) 1506 or directly. For example, communication interface(s) 1514 can enable communication through one or more network(s) 1506, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1502 can further include one or more input/output (I/O) devices 1514. The I/O devices 1514 can include speakers, a microphone, a camera, and various user controls (e.g., buttons, a joystick, a keyboard, a keypad, etc.), a haptic output device, and so forth. The I/O devices 1514 can also include attachments that leverage the accessories (audio-jack, USB-C, Bluetooth, etc.) to connect with the user device 1502.

In at least one example, user device 1502 can include a display 1516. Depending on the type of computing device(s) used as the user device 1502, the display 1516 can employ any suitable display technology. For example, the display 1516 can be a liquid crystal display, a plasma display, a light emitting diode display, an OLED (organic light-emitting diode) display, an electronic paper display, or any other suitable type of display able to present digital content thereon. In at least one example, the display 1516 can be an augmented reality display, a virtually reality display, or any other display able to present and/or project digital content. In some examples, the display 1516 can have a touch sensor associated with the display 1516 to provide a touchscreen display configured to receive touch inputs for enabling interaction with a graphic interface presented on the display 1516. Accordingly, implementations herein are not limited to any particular display technology. Alternatively, in some examples, the user device 1502 may not include the display 1516, and information can be presented by other means, such as aurally, haptically, etc.

In addition, the user device 1502 can include sensor(s) 1518. The sensor(s) 1518 can include a GPS device able to indicate location information. Further, the sensor(s) 1518 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1412, described above, to provide one or more services. That is, in some examples, the service provider 1412 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1414 and/or for sending users 1414 notifications regarding available appointments with merchant(s) located proximate to the users 1414. In at least one example, location can be used for taking payments from nearby customers when they leave a geofence, or location can be used to initiate an action responsive to users 1414 enter a brick-and-mortar store of a merchant. Location can be used in additional or alternative ways as well.

Additionally, the user device 1502 can include various other components that are not shown, examples of which include removable storage, a power source, such as a battery and power control unit, a barcode scanner, a printer, a cash drawer, and so forth.

In addition, in some examples, the user device 1502 can include, be connectable to, or otherwise be coupled to a reader device 1526, for reading payment instruments and/or identifiers associated with payment objects. In some examples, as described above, the reader device 1526 can plug in to a port in the user device 1502, such as a microphone port, a headphone port, an audio-jack, a data port, or other suitable port. In additional or alternative examples, the reader device 1526 can be coupled to the user device 1502 via another wired or wireless connection, such as via a Bluetooth®, BLE, and so on. The reader device 1526 can include a read head for reading a magnetic strip of a payment card, and further can include encryption technology for encrypting the information read from the magnetic strip. Additionally or alternatively, the reader device 1526 can be an EMV payment reader, which in some examples, can be embedded in the user device 1502. Moreover, numerous other types of readers can be employed with the user device 1502 herein, depending on the type and configuration of the user device 1502.

The reader device 1526 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1526 may include hardware implementation, such as slots, magnetic tracks, and rails with one or more sensors or electrical contacts to facilitate detection and acceptance of a payment instrument. That is, the reader device 1526 may include hardware implementations to enable the reader device 1526 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1526 may also include a biometric sensor to receive and process biometric characteristics and process them as payment instruments, given that such biometric characteristics are registered with the service provider 1412 and connected to a financial account with a bank server.

The reader device 1526 may include processing unit(s), computer-readable media, a reader chip, a transaction chip, a timer, a clock, a network interface, a power supply, and so on. The processing unit(s) of the reader device 1526 may execute one or more modules and/or processes to cause the reader device 1526 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1526, the computer-readable media may include volatile memory (such as RAM), non-volatile memory (such as ROM, flash memory, miniature hard drive, memory card, or the like), or some combination thereof. In at least one example, the computer-readable media of the reader device 1526 may include at least one module for performing various functions as described herein.

The reader chip may perform functionalities to control the operations and processing of the reader device 1526. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 156, which may provide a clock signal indicating a time. Furthermore, the reader chip may perform functionality to control the network interface, which may interface with the network(s) 1506, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1526. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1502, which can be a POS terminal, and the reader device 1526 are shown as separate devices, in additional or alternative examples, the user device 1502 and the reader device 1526 can be part of a single device, which may be a battery-operated device. In such an example, components of both the user device 1502 and the reader device 1526 may be associated with the single device. In some examples, the reader device 1526 can have a display integrated therewith, which can be in addition to (or as an alternative of) the display 1516 associated with the user device 1502.

The server(s) 1504 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1504 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1504 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1504 can include one or more processors 1528, one or more computer-readable media 1530, one or more I/O devices 1532, and one or more communication interfaces 1534. Each processor can be a single processing unit or a number of processing units, and can include single or multiple computing units or multiple processing cores. The processor(s) 1528 can be implemented as one or more microprocessors, microcomputers, microcontrollers, digital signal processors, central processing units, state machines, logic circuitries, and/or any devices that manipulate signals based on operational instructions. For example, the processor(s) 1528 can be one or more hardware processors and/or logic circuits of any suitable type specifically programmed or configured to execute the algorithms and processes described herein. The processor(s) 1528 can be configured to fetch and execute computer-readable instructions stored in the computer-readable media 1530, which can program the processor(s) 1528 to perform the functions described herein.

The computer-readable media 1530 can include volatile and nonvolatile memory and/or removable and non-removable media implemented in any type of technology for storage of information, such as computer-readable instructions, data structures, program modules, or other data. Such computer-readable media 1530 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1504, the computer-readable media 1530 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1530 can be used to store any number of functional components that are executable by the processor(s) 1528. In many implementations, these functional components comprise instructions or programs that are executable by the processors 1528 and that, when executed, specifically configure the one or more processors 1528 to perform the actions attributed above to the service provider 1412 and/or payment processing service. Functional components stored in the computer-readable media 1530 can optionally include a lending component 1536, a payment processing component 1538, a training component 1540, and one or more other modules and data 1542.

The lending component 1536 can facilitate lending for the service provider. That is, the lending component 1536 can perform actions to effectuate operations related to lending as described herein. For example, the lending component 1536 can identify merchants that are eligible for lending products and/or activate lending products, as described above with reference to FIG. 10, and/or manage repayment of lending products, as described above with reference to FIGS. 11 and 12. In some examples, the lending component 1536 can cause data to be presented via user interfaces, such as those described above with reference to FIGS. 1-5.

The payment processing component 1538 can be configured to receive transaction data from POS systems, such as the POS system 1424 described above with reference to FIG. 14. The payment processing component 1538 can transmit requests (e.g., authorization, capture, settlement, etc.) to payment service server computing device(s) to facilitate transactions between merchants and customers. The payment processing component 1538 can communicate the successes or failures of the transactions to the POS systems. Additional details associated with payment processing associated with payments of transactions are described above with reference to FIG. 13. In at least one example, the payment processing component 1538 can perform operations described above with reference to FIG. 13.

The training component 1540 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1502 and/or the server(s) 1504 for use at a time after the data models have been trained (e.g., at runtime).

The one or more other modules and data 1542 can include programs, drivers, etc., and the data used or generated by the functional components. Further, the server(s) 1504 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Components are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1530 can additionally include an operating system 1544 for controlling and managing various functions of the server(s) 1504.

The communication interface(s) 1534 can include one or more interfaces and hardware components for enabling communication with various other devices, such as over the network(s) 1506 or directly. For example, communication interface(s) 1534 can enable communication through one or more network(s) 1506, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1506 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1504 can further be equipped with various I/O devices 1532. Such I/O devices 1532 can include a display, various user interface controls (e.g., buttons, joystick, keyboard, mouse, touch screen, biometric or sensory input devices, etc.), audio speakers, connection ports and so forth.

In at least one example, the system 1500 can include a data store(s) 1546 that can be configured to store data that is accessible, manageable, and updatable. In some examples, the data store(s) 1546 can be integrated with the user device 1502 and/or the server(s) 1504. In other examples, as shown in FIG. 15, the data store(s) 1546 can be located remotely from the server(s) 1504 and can be accessible to the server(s) 1504. The data store(s) 1546 can comprise multiple databases and/or servers connected locally and/or remotely via the network(s) 1506.

In at least one example, the data store(s) 1546 can store user profiles, which can include merchant profiles, customer profiles, and so on. A "profile" can alternatively be called an "account" or can be associated with any other entity-specific portion of the data store(s) 1546.

Merchant profiles can store, or otherwise be associated with, data associated with merchants. For instance, a merchant profile can store, or otherwise be associated with, data about a merchant (e.g., name, phone number, email, social media handle, geographic location, operating hours, etc.), merchant identifier(s) (e.g., unique identifier, phone number, email address, social media handle, etc.) associated with the merchant, payment instrument(s) and/or account(s) associated with the merchant, a merchant category classification (MCC) associated with the merchant, item(s) offered for sale by the merchant, hardware (e.g., device type) used by the merchant, a length of time the merchant has used services of the service provider, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), lending data associated with the merchant (e.g., previous lending products used by the merchant, repayment progress in association with existing lending products used by the merchant, previous defaults on said lending products, etc.), risk data associated with the merchant (e.g., FICO score, indications of risk, instances of fraud, chargebacks, etc.), appointments data (e.g., previous appointments, upcoming (scheduled) appointments, timing of appointments, lengths of appointments, etc.) associated with the merchant, payroll data (e.g., employees, payroll frequency, payroll amounts, etc.) associated with the merchant, employee data associated with the merchant, permission data (e.g., indications of which operations are associated with permission(s), which employees have said permission(s), etc.) associated with the merchant, reservations data (e.g., previous reservations, upcoming (scheduled) reservations, interactions associated with such reservations, etc.) associated with the merchant, inventory data associated with the merchant, customer service data associated with the merchant, etc. The merchant profile can securely store bank account information as provided by the merchant. Further, the merchant profile can store payment information associated with a payment instrument linked to a stored balance of the merchant, such as a stored balance maintained by the service provider 1412.

Customer profiles can store customer data including, but not limited to, data about a customer (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the data store(s) 1546 can store inventory database(s) and/or catalog database(s). As described above, an inventory can store data associated with a quantity of each item that a merchant has available to the merchant. Furthermore, a catalog can store data associated with items that a merchant has available for acquisition. The data store(s) 1546 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Example Clauses

A. A method, implemented at least in part by one or more server computing devices of a service provider, comprising: receiving indications of purchases made using a payment instrument associated with a first lending product offered by the service provider; storing the indications in a first data structure; determining, based at least in part on the indications, a balance associated with the first lending product, wherein the balance is associated with the first data structure; comparing the balance associated with the first lending product to a first predetermined threshold; based at least in part on determining that the balance exceeds the first predetermined threshold: generating a second data structure that is associated with a second lending product; and associating a portion of the balance with the second data structure, wherein the first lending product and the second lending product are independently associated with different repayment mechanisms.

B. The method as clause A recites, wherein the first data structure is a parent data structure and the second data structure is a child data structure, the method further comprising: determining that the portion of the balance associated with the second data structure is below a second predetermined threshold; and merging data associated with the second data structure into the first data structure.

C. The method as clause A or B recites, wherein the balance is compared to the predetermined threshold at a date corresponding to a due date for repayment of the balance.

D. The method as clause C recites, wherein the second lending product (i) extends a repayment period past the due date and (ii) applies a portion of revenue from future payments processed by the service provider on behalf of a merchant associated with the payment instrument to repay the portion of the balance.

E. The method as any of clauses A-D recites, wherein the portion of the balance comprises an amount of the balance that exceeds the first predetermined threshold.

F. The method as any of clauses A-E recites, wherein the first predetermined threshold and the second predetermined threshold are both a zero balance.

G. A system comprising: one or more processors; and one or more computer-readable media storing instructions that, when executed by the one or more processors, cause the system to perform operations comprising: storing, in association with a first data structure, one or more indications of one or more purchases made using a payment instrument associated with a first lending product, wherein the first data structure is associated with a balance determined based at least in part on the one or more indications; and based at least in part on determining that the balance exceeds a predetermined threshold, generating a second data structure that is associated with a second lending product, wherein the second data structure is associated with a portion of the balance and wherein the first lending product and the second lending product are independently associated with different repayment mechanisms.

H. The system as clause G recites, the operations further comprising: based at least in part on determining that the balance exceeds the predetermined threshold, causing a user interface to be presented via a display of a device operable by a user, wherein the user interface includes a control, actuation of which, enables the user to transfer the portion of the balance to the second lending product; and generating the second data structure further based at least in part on receiving an indication of actuation of the control.

I. The system as clause H recites, wherein the user interface is presented on or prior to a date corresponding to a due date for repayment of the balance.

J. The system as any of clauses G-I recites, wherein the balance is compared to the predetermined threshold at a date corresponding to a due date for repayment of the balance and the second data structure is automatically generated based at least in part on determining that the balance exceeds the predetermined threshold.

K. The system as any of clauses G-J recites, wherein a repayment mechanism associated with the first lending product comprises automatic repayment via a linked bank account of a user associated with the payment instrument.

L. The system as any of clauses G-K recites, wherein the payment instrument is associated with a merchant that uses a payment processing service for processing payments, the operations further comprising: receiving transaction data associated with a transaction between the merchant and a customer; processing payment for the transaction based at least in part on the transaction data; and based at least in part on the portion of the balance being associated with the second data structure, applying a portion of revenue from payment of the transaction to the portion of the balance.

M. The system as any of clauses G-L recites, wherein the second lending product comprises at least one of a capital loan, a loan from a third party, or a loan that utilizes a portion of revenue from future payments processed on behalf of a merchant associated with the payment instrument to repay the portion of the balance.

N. The system as any of clauses G-M recites, the operations further comprising: based at least in part on determining that the balance exceeds the predetermined threshold, causing a user interface to be presented via a display of a device operable by a user, wherein the user interface includes one or more user interface elements representative of one or more options associated with the second lending product; receiving an indication of a selection of one of the one or more options; and generating the second data structure further based at least in part on receiving the indication of the selection, wherein the second lending product is associated with the selection.

O. The system as clause N recites, the operations further comprising: determining, based at least in part on using a machine-trained model, an option of the one or more options to recommend for the user; and causing an indicator of the recommended option to be presented in association with the option on the user interface.

P. One or more computer-readable media storing instructions that, when executed by one or more processors, cause the one or more processors to perform operations comprising: storing, in association with a first data structure, one or more indications of one or more purchases made using a payment instrument associated with a first lending product, wherein the first data structure is associated with a balance determined based at least in part on the one or more indications; and based at least in part on determining that the balance exceeds a predetermined threshold, associating a portion of the balance with a second data structure associated with a second lending product, wherein the first lending product and the second lending product are independently associated with different repayment mechanisms.

Q. The one or more computer-readable media as clause P recites, wherein the second lending product is associated with one or more terms, the operations further comprising determining the one or more terms based at least in part on data associated with a user of the payment instrument and using a machine-trained model.

R. The one or more computer-readable media as clause Q recites, wherein the one or more terms comprise a length of an extension of time for repayment, a percentage of revenue withheld from transactions processed for the user for repayment of the portion of the balance, or a flat fee assessed for moving the portion of the balance to the second lending product.

S. The one or more computer-readable media as any of clauses P-R recites, the operations further comprising: receiving one or more additional indications of one or more additional purchases made after the portion of the balance has been associated with the second data structure; storing the one or more additional indications in association with the first data structure; determining a new balance based at least in part on the one or more additional indications; determining that the new balance exceeds the predetermined threshold; and associating a portion of the new balance with the second data structure.

T. The one or more computer-readable media as clause S recites, the operations further comprising determining one or more updated terms associated with the second lending product prior to associating the portion of the new balance with the second data structure.

While the example clauses described above are described with respect to one particular implementation, it should be understood that, in the context of this document, the content of the example clauses can also be implemented via a method, device, system, a computer-readable medium, and/or another implementation. Additionally, any of example clauses A-T may be implemented alone or in combination with any other one or more of the example clauses A-T.

What is claimed is:

1. A method, implemented at least in part by one or more server computing devices of a service provider, comprising:
    training a machine learning model using transaction data received from a plurality of merchant computing devices associated with a plurality of merchants associated with the service provider, the transaction data related to a plurality of transactions conducted between the plurality of merchants and a plurality of customers, the transaction data received via a distributed network-based system in which the plurality of merchant computing devices are configured to send the transaction data to at least one of the server computing devices of the service provider;
    customizing an application programming interface (API) by customizing API interfaces of the API for communication with respective computing devices of respective financial institutions of a plurality of financial institutions based on characteristics of respective platforms of the respective computing devices of the respective financial institutions, and for communication with respective merchant computing devices of the plurality of merchant computing devices based on characteristics of respective platforms of the respective merchant computing devices, wherein the API is provided by the service provider for enabling communication between the plurality of merchant computing devices of the plurality of merchants associated with the service provider, the service provider, and a plurality of financial institution computing devices of the plurality of financial institutions;
    receiving, via the API, information related to purchases made by a merchant of the plurality of merchants using a payment instrument associated with a first lending product offered by a first financial institution of the plurality of financial institutions, wherein the payment instrument is associated with the merchant;
    establishing a first data structure and connection with the first financial institution via the API;
    storing, in the first data structure, the information related to the purchases made by the merchant using the payment instrument associated with the first lending product offered by the first financial institution;
    determining, based at least in part on the information regarding the purchases made by the merchant using the payment instrument associated with the first lending product, a balance associated with the first lending product, wherein the balance is associated with the information regarding the purchases stored in the first data structure;
    comparing the balance associated with the first lending product to a first predetermined threshold;
    based at least in part on determining that the balance exceeds the first predetermined threshold:
        using the trained machine learning model to select a second lending product for the merchant, the trained machine learning model determining that the merchant qualifies for the second lending product based on information related to the merchant;
        establishing a second data structure and connection with a second financial institution via the API, wherein the second data structure is associated with the second lending product offered by the second financial institution, wherein, based on the customized API interfaces of the API, the service provider establishes the first data structure and the connection with the first financial institution separately from the second data structure and the connection with the second financial institution to securely bridge communication between the merchant and the first financial institution separately from communication between the merchant and the second financial institution; and associating a portion of the balance with the second data structure, wherein the second data structure and the first data structure are associated with the merchant and are particular to the merchant, wherein the first lending product and the second lending product are independently associated with different repayment mechanisms, and wherein a repayment mechanism associated with the second lending product applies a portion of revenue from future payments processed by the service provider on behalf of the merchant to repay the portion of the balance.

2. The method as claim 1 recites, wherein the first data structure is a parent data structure and the second data structure is a child data structure, the method further comprising:

determining that the portion of the balance associated with the second data structure is below a second predetermined threshold; and merging data associated with the second data structure into the first data structure.

3. The method as claim 1 recites, wherein the balance is compared to the first predetermined threshold at a date corresponding to a due date for repayment of the balance.

4. The method as claim 3 recites, wherein the second lending product extends a repayment period past the due date.

5. The method as claim 1 recites, wherein the portion of the balance comprises an amount of the balance that exceeds the first predetermined threshold.

6. A system comprising:
one or more processors; and
one or more computer-readable media storing instructions that, when executed by the one or more processors, cause the system to perform operations comprising:
training a machine learning model using transaction data received from a plurality of merchant computing devices associated with a plurality of merchants associated with a service provider, the transaction data related to a plurality of transactions conducted between the plurality of merchants and a plurality of customers, the transaction data received via a distributed network-based system in which the plurality of merchant computing devices are configured to send the transaction data to at least one of the server computing devices of the service provider;
customizing an application programming interface (API) by customizing API interfaces of the API for communication with respective computing devices of respective financial institutions of a plurality of financial institutions based on characteristics of respective platforms of the respective computing devices of the respective financial institutions, and for communication with respective merchant computing devices of the plurality of merchant computing devices based on characteristics of respective platforms of the respective merchant computing devices, wherein the API is provided by the service provider for enabling communication between the plurality of merchant computing devices of the plurality of merchants associated with the service provider, the service provider, and a plurality of financial institution computing devices of the plurality of financial institutions;

receiving, via the API, information related to purchases made by a merchant of the plurality of merchants using a payment instrument associated with a first lending product offered by a first financial institution of the plurality of financial institutions, wherein the payment instrument is associated with the merchant;

establishing a first data structure and connection with the first financial institution via the API;

storing, in the first data structure, the information related to the purchases made by the merchant using the payment instrument associated with the first lending product offered by the first financial institution, wherein the first data structure is associated with a balance determined based at least in part on the information related to the purchases that is stored in the first data structure; and based at least in part on determining that the balance exceeds a predetermined threshold, using the trained machine learning model to select a second lending product for the merchant, the trained machine learning model determining that the merchant qualifies for the second lending product based on information related to the merchant, establishing a second data structure and connection with a second financial institution via the API, wherein the second data structure is associated with the second lending product offered by the second financial institution, wherein, based on the customized API interfaces of the API, the service provider establishes the first data structure and the connection with the first financial institution separately from the second data structure and the connection with the second financial institution to securely bridge communication between the merchant and the first financial institution separately from communication between the merchant and the second financial institution, wherein:

the second data structure and the first data structure are associated with the merchant and are particular to the merchant, the second data structure is associated with a portion of the balance, the first lending product and the second lending product are independently associated with different repayment mechanisms, and at least one repayment mechanism associated with the second lending product applies a portion of revenue from future payments processed by the service provider on behalf of the merchant to repay the portion of the balance.

7. The system as claim 6 recites, the operations further comprising:

based at least in part on determining that the balance exceeds the predetermined threshold, causing a user interface to be presented via a display of a device operable by a user, wherein the user interface includes a control, actuation of which, enables the user to transfer the portion of the balance to the second lending product; and establishing the second data structure further based at least in part on receiving an indication of actuation of the control.

8. The system as claim 7 recites, wherein the user interface is presented on or prior to a date corresponding to a due date for repayment of the balance.

9. The system as claim 6 recites, wherein the balance is compared to the predetermined threshold at a date corresponding to a due date for repayment of the balance and the second data structure is automatically established based at least in part on determining that the balance exceeds the predetermined threshold.

10. The system as claim 6 recites, wherein a repayment mechanism associated with the first lending product comprises automatic repayment via a linked bank account of a user associated with the payment instrument.

11. The system as claim 6 recites, the operations further comprising:
  receiving, at a time after the second data structure has been established, transaction data associated with a transaction between the merchant and a customer; and
  processing payment for the transaction based at least in part on the transaction data, wherein the payment comprises one of the future payments from which the portion of revenue is applied to repay the portion of the balance.

12. The system as claim 6 recites, the operations further comprising:
  based at least in part on determining that the balance exceeds the predetermined threshold, causing a user interface to be presented via a display of a device operable by a user, wherein the user interface includes one or more user interface elements representative of one or more options associated with the second lending product;
  receiving an indication of a selection of one of the one or more options; and
  establishing the second data structure further based at least in part on receiving the indication of the selection, wherein the second lending product is associated with the selection.

13. The system as claim 12 recites, the operations further comprising:
  determining, based at least in part on using the trained machine learning model, an option of the one or more options to recommend for the user; and
  causing an indicator of the recommended option to be presented in association with the option on the user interface.

14. One or more non-transitory computer-readable media storing instructions that, when executed by one or more processors, cause the one or more processors to perform operations comprising:
  training a machine learning model using transaction data received from a plurality of merchant computing devices associated with a plurality of merchants associated with a service provider, the transaction data related to a plurality of transactions conducted between the plurality of merchants and a plurality of customers, the transaction data received via a distributed network-based system in which the plurality of merchant computing devices are configured to send the transaction data to at least one of the server computing devices of the service provider;
  customizing an application programming interface (API) by customizing API interfaces of the API for communication with respective computing devices of respective financial institutions of a plurality of financial institutions based on characteristics of respective platforms of the respective computing devices of the respective financial institutions, and for communication with respective merchant computing devices of the plurality of merchant computing devices based on characteristics of respective platforms of the respective merchant computing devices, wherein the API is provided by the service provider for enabling communication between the plurality of merchant computing devices of the plurality of merchants associated with the service provider, the service provider, and a plurality of financial institution computing devices of the plurality of financial institutions;
  receiving, via the API, information related to purchases made by a merchant of the plurality of merchants using a payment instrument associated with a first lending product offered by a first financial institution of the plurality of financial institutions, wherein the payment instrument is associated with the merchant;
  establishing a first data structure and connection with the first financial institution via the API;
  storing, in the first data structure, the information related to the purchases made by the merchant using the payment instrument associated with the first lending product offered by the first financial institution, wherein the first data structure is associated with a balance determined based at least in part on the information related to the purchases that is stored in the first data structure; and
  based at least in part on determining that the balance exceeds a predetermined threshold, using the trained machine learning model to select a second lending product for the merchant, the trained machine learning model determining that the merchant qualifies for the second lending product based on information related to the merchant; establishing a second data structure and connection with a second financial institution via the API, wherein the second data structure is associated with the second lending product offered by the second financial institution, wherein, based on customized API interfaces of the API, the service provider establishes the first data structure and the connection with the first financial institution separately from the second data structure and the connection with the second financial institution to securely bridge communication between the merchant and the first financial institution separately from communication between the merchant and the second financial institution,
  wherein the second data structure and the first data structure are associated with the merchant and are particular to the merchant,
  wherein the second data structure is associated with a portion of the balance,
  wherein the first lending product and the second lending product are independently associated with different repayment mechanisms, and
  wherein a repayment mechanism associated with the second lending product applies a portion of revenue from future payments processed by the service provider on behalf of the merchant to repay the portion of the balance.

15. The one or more non-transitory computer-readable media as claim 14 recites, wherein the second lending product is associated with one or more terms, the operations further comprising determining the one or more terms based at least in part on data associated with a user of the payment instrument and using the trained machine learning model.

16. The one or more non-transitory computer-readable media as claim 15 recites, wherein the one or more terms comprise a length of an extension of time for repayment, a percentage of revenue withheld from the future payments processed by the service provider, or a flat fee assessed for moving the portion of the balance to the second lending product.

17. The one or more non-transitory computer-readable media as claim 14 recites, the operations further comprising:
  receiving one or more additional indications of one or more additional purchases made after the portion of the balance has been associated with the second data structure;
  storing the one or more additional indications in association with the first data structure;
  determining a new balance based at least in part on the one or more additional indications;
  determining that the new balance exceeds the predetermined threshold; and
  associating a portion of the new balance with the second data structure.

18. The one or more non-transitory computer-readable media as claim 17 recites, the operations further comprising determining one or more updated terms associated with the second lending product prior to associating the portion of the new balance with the second data structure.

19. The method as claim 1 recites, wherein a hold rate associated with the portion of revenue withheld from future payments processed by the service provider on behalf of the merchant is determined based at least in part on one or more of a predicted payment processing metric associated with the merchant, the portion of the balance associated with the second data structure, or a repayment period associated with repayment of the portion of the balance associated with the second data structure.

20. The method as claim 2 recites, wherein the first predetermined threshold and the second predetermined threshold are both a zero balance.

\* \* \* \* \*